US012254741B2

(12) United States Patent
Acres et al.

(10) Patent No.: US 12,254,741 B2
(45) Date of Patent: Mar. 18, 2025

(54) DISTRIBUTED SYSTEM FOR MANAGING AND PROVIDING SERVICES TO ELECTRONIC GAMING MACHINES

(71) Applicant: Acres Technology, Las Vegas, NV (US)

(72) Inventors: John F. Acres, Las Vegas, NV (US); Mark Dailey, Las Vegas, NV (US)

(73) Assignee: Acres Technology, Las Vegas, NV (US)

(*) Notice: Subject to any disclaimer, the term of this patent is extended or adjusted under 35 U.S.C. 154(b) by 0 days.

(21) Appl. No.: 18/312,297

(22) Filed: May 4, 2023

(65) Prior Publication Data

US 2024/0038019 A1 Feb. 1, 2024

Related U.S. Application Data

(63) Continuation of application No. 17/467,797, filed on Sep. 7, 2021, now Pat. No. 11,688,233, which is a continuation of application No. 16/860,489, filed on Apr. 28, 2020, now Pat. No. 11,138,826.

(60) Provisional application No. 62/938,100, filed on Nov. 20, 2019, provisional application No. 62/840,013, filed on Apr. 29, 2019.

(51) Int. Cl.
*G07F 17/32* (2006.01)
*G07F 17/34* (2006.01)

(52) U.S. Cl.
CPC .......... *G07F 17/3223* (2013.01); *G07F 17/34* (2013.01)

(58) Field of Classification Search
CPC ..... G07F 17/3223; G07F 17/34; H04W 16/00
See application file for complete search history.

(56) References Cited

U.S. PATENT DOCUMENTS

| | | | | |
|---|---|---|---|---|
| 5,457,306 A * | 10/1995 | Lucero | G07F 17/3281 | 902/23 |
| 5,811,772 A * | 9/1998 | Lucero | G07F 17/3281 | 902/23 |
| 6,585,598 B2 * | 7/2003 | Nguyen | G07F 17/3244 | 463/41 |
| 7,380,155 B2 * | 5/2008 | Fung | G06F 11/1662 | 714/4.11 |
| 8,128,485 B2 * | 3/2012 | Vlazny | G07F 17/329 | 463/28 |
| 2003/0171145 A1 * | 9/2003 | Rowe | G06Q 20/02 | 463/25 |
| 2004/0204233 A1 * | 10/2004 | Saffari | G07F 17/32 | 463/25 |

(Continued)

OTHER PUBLICATIONS

U.S. Appl. No. 17/467,797 (2021/0407249), filed Sep. 7, 2021 (Dec. 30, 2021), John F. Acres (Acres Technology).

(Continued)

*Primary Examiner* — Steve Rowland
(74) *Attorney, Agent, or Firm* — Ballard Spahr LLP

(57) ABSTRACT

Embodiments of the present invention are directed to distributed systems that include networked master and slave circuits that are each connected to a plurality of electronic gaming machines on a casino floor. Each circuit receives digital information from a data port on an electronic gaming machine to which it is connected and also transmits commands, such as TITO commands, to the electronic gaming machine via the data port. A slave circuit can also function as the master circuit, e.g., when a master circuit fails.

26 Claims, 24 Drawing Sheets

(56) References Cited

U.S. PATENT DOCUMENTS

| | | | | |
|---|---|---|---|---|
| 2005/0107155 | A1* | 5/2005 | Potts | G07F 17/3255 463/25 |
| 2007/0060326 | A1* | 3/2007 | Juds | G07F 17/3248 463/29 |
| 2007/0087834 | A1* | 4/2007 | Moser | G07F 17/3255 463/42 |
| 2007/0173322 | A1* | 7/2007 | Swamy | G07F 17/3281 463/42 |
| 2008/0113810 | A1* | 5/2008 | Kubota | A63F 13/30 463/42 |
| 2009/0239667 | A1 | 9/2009 | Rowe et al. | |
| 2009/0284348 | A1 | 11/2009 | Pfeffer | |
| 2011/0071880 | A1 | 3/2011 | Spector | |
| 2013/0065686 | A1* | 3/2013 | LeMay | G07F 17/32 463/37 |
| 2013/0244760 | A1* | 9/2013 | Baltz | G07F 17/32 463/25 |
| 2015/0242618 | A1* | 8/2015 | Itskov | G07F 17/3227 726/4 |
| 2016/0086145 | A1* | 3/2016 | Tsutsui | G06Q 50/01 463/25 |
| 2016/0086445 | A1* | 3/2016 | Tsutsui | G07F 7/04 463/25 |
| 2017/0092062 | A1* | 3/2017 | Tsutsui | G06Q 30/0271 |
| 2018/0089036 | A1* | 3/2018 | Marusinec | G06F 21/78 |
| 2020/0090463 | A1* | 3/2020 | Mohrhardt | G07F 17/3216 |
| 2020/0342710 | A1* | 10/2020 | Acres | G07F 17/3223 |
| 2021/0065497 | A1* | 3/2021 | Bettcher | G06K 19/06037 |
| 2024/0096170 | A1* | 3/2024 | Baerlocher | G07F 17/329 |

OTHER PUBLICATIONS

U.S. Appl. No. 16/860,489 (U.S. Pat. No. 11,138,826), filed Apr. 28, 2020 (Oct. 5, 2021), John F. Acres (Acres Technology).

* cited by examiner

To FIG. 5B

DISTRIBUTED SYSTEM FOR MANAGING AND PROVIDING SERVICES TO ELECTRONIC GAMING MACHINES

CROSS REFERENCE TO RELATED PATENT APPLICATIONS

This application is a continuation of U.S. patent application Ser. No. 17/467,797 filed Sep. 7, 2021, which is a continuation of U.S. patent application Ser. No. 16/860,489 filed Apr. 28, 2020, issued as U.S. Pat. No. 11,138,826 on Oct. 5, 2021, which claims priority to U.S. Provisional Application No. 62/840,013 filed Apr. 29, 2019, and to U.S. Provisional Application No. 62/938,100 filed on Nov. 20, 2019, which are hereby incorporated by reference in their entirety.

FIELD OF THE INVENTION

This disclosure relates generally to gaming systems, and more particularly to systems that connect electronic gaming machines on a network and that provide services to the gaming machines as well as management functions.

BACKGROUND

Electronic gaming machines, such as slot machines or video poker machines, employee at least one computer processor that generates a random outcome for each game and controls how the outcome is revealed to a player, e.g., using a stepper motor to spin reels on a slot machine or showing cards on a video display of a poker machine. There are also a variety of associated devices that enable wagering and play. For example, wager buttons for selecting the amount of a wager, a game initiation button, a ticket reader, bill validators, speakers, lights, and key pads, to name a few.

Gaming machines may operate on a stand-alone basis or they may be connected to a network of gaming machines, which is the case in almost all casinos. Networked gaming machines may have a variety of services provided to them via a remote server in a secure room or from a secure server on the gaming floor. These may include progressive jackpots, player tracking, electronic funds transfers to or from the gaming machine, cashless ticket transactions (known as ticket-in, ticket out or TITO) and dispatch of casino employees to a gaming machine, among others. In addition, the operator of the networked gaming machines can collect data from the network at a remote server, also in a secure room, including accounting information that can be complied into various reports. This enables the operator to collect information such as amounts wagered and paid in awards, to account for cashless ticket transactions, and to track the amount wagered by each player enrolled in a player tracking club.

The accounting, cashless tickets, loyalty, and audit functions are all sold as a suite by several large systems makers, each with its own proprietary system. A casino that is dissatisfied with any one of these features must replace the entire group. Doing so is both disruptive and expensive.

There are a number of technical problems associated with current systems on such networks. Current systems require a slot machine interface board (SMIB) to be installed in each gaming machine. The SMIB interfaces between the gaming machine and the network and requires its own power supply. The SMIB board is bulky and combined with its power supply takes up a lot of space in the gaming machine cabinet. The SMIB may be a multi-protocol interface that monitors communication between the network and at least one gaming machine. It can communicate, in a variety of protocols if necessary, over the network with hosts, i.e., remote servers, that provide the services and accounting features mentioned above.

Each SMIB is connected to a bank controller, which accumulates information from a plurality of the SMIBs and sends it to the servers in the secure room. Each SMIB also receives information from the servers, such as approvals for electronic fund transfers to and from the gaming machine and cashless ticket transactions, which it then relays to the gaming machine. Like the SMIB, each bank controller has its own power supply. There may be numerous bank controllers in a large casino.

In addition, the current system requires network switches, also each with its own power supply, to direct traffic on the network. As a result of these SMIBs, bank controllers, and network switches, and their respective power supplies, current systems are difficult to install and maintain.

Still another problem with the current systems is that they are proprietary so interfacing with third-party vendors is difficult. For example, if a casino wishes to use a different vendor from the one that provided the integrated suite (accounting, cashless tickets, loyalty, and audit functions), e.g., to provide a progressive bonus, interfacing another company's product with the network is not easy. Interoperability among systems provided by different manufacturers is difficult, expensive, and often impossible.

One reason for these difficulties relates to the technology used in current systems, which are mostly provided by several large companies that have been using the same technology that was developed in the mid-1990s. A third-party vendor needs access to the network data to provide services such as bonuses, progressive jackpots, dispatch, or any other service. For security reasons, this is typically provided via an application programming interface (API) that accesses a read-only database, which stores data from the network. The system provider controls what data is available in the API database as well as the architecture of the API. If the systems provider changes either of these, a third-party vendor's system that uses the API may be adversely affected.

Many transactions, such as bonus or progressive jackpots awards, must be quickly executed. Data is not able to move quickly enough from the gaming machine, through the SMIB, its associated bank controller, and into the API database for processing by the vendor's system, which then must send a command, such as a jackpot pay, back through the various network components to the gaming machine in a timely fashion.

Reliability is a problem with the prior art systems. If a network connection is broken, the gaming machines downstream of the break are not able to function because ticket validation and electronic funds transfers, which are provided by the network, are not available. What is more, if a server crashes, the entire floor is down, i.e., the gaming machines are unplayable.

The SMIB typically includes a large capacitor to temporarily maintain voltage after a power failure and some ferromagnetic RAM that can store data without power to preserve the accounting and transaction data, which can then be accessed when the power is restored. But power backup and management is problematic because of all the power supplies—for the SMIB s, the bank controllers, and the network switches—that must all be dealt with in a coordinated manner when power is lost.

The present system addresses all these technical problems in a highly secure environment and provides additional benefits as will become apparent in the following description and related drawings.

DETAILED DESCRIPTION

Figure 1:
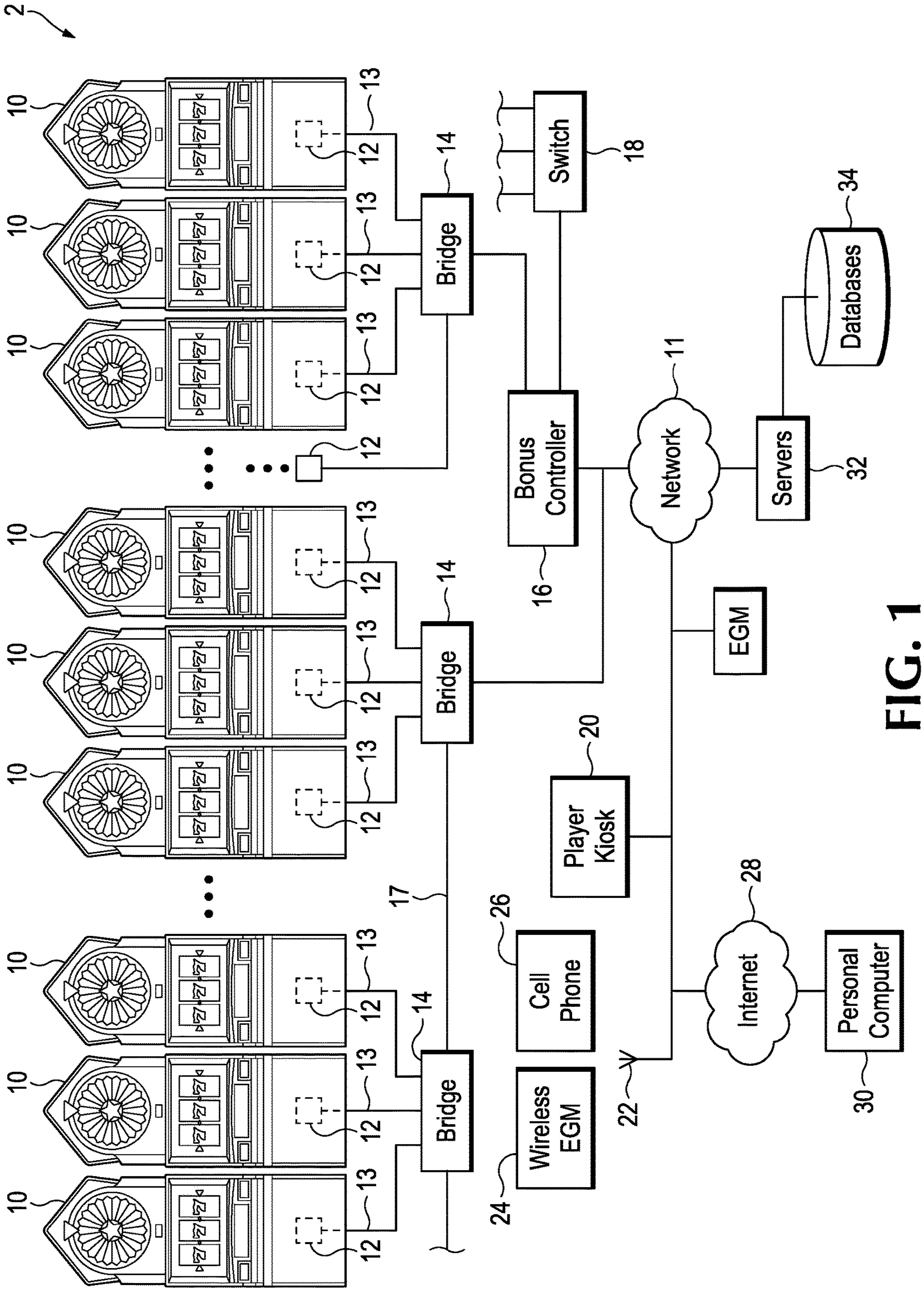
FIG. 1 is a system diagram illustrating various components of a gaming system according to embodiments of the system.

FIG. 1 is a system diagram illustrating various components of a gaming system according to embodiments of the invention. The gaming system 2 includes several EGMs 10, similar to EGM 200 in FIG. 2, that are each ultimately connected to a gaming network 11. Each of EGMs 10 of FIG. 1 connect to the gaming network 11 (which may be an Ethernet network) through first, a gaming machine interface (GMI) 12 and then a bridge control circuit (bridge) 14. Each GMI 12 is a circuit that is contained in a metal box which, in the present embodiment, measures 1.75 inches long by 1 inch wide by 0.625 inches tall. As can be seen, each GMI 12 is further connected to a bridge 14, each bridge accommodating multiple GMI connections, via their respective cables 13. In the present embodiments, up to 8 EGMs may be connected to each bridge. It should be appreciated that the number of connections is merely a matter of design, and more or less could be connected. For example, a single bridge may accommodate up to 64 EGMs, which would enable a single bridge to serve all of the machines in most all slot machines banks. It should be noted that not all of the jacks must be used. In other words, fewer than 8 GMIs (or whatever the maximum number is) can be connected to each bridge. The dots adjacent the groups of EGMs in FIG. 1 signify additional EGMs each with a corresponding GMI connected to a bridge, but to simplify the drawing only 3 machines in each group are depicted. The bridge circuit is also contained in a metal box, which measures 7.75 by 7.75 inches by 1.625 inches tall. The bridge box may be contained in the cabinet of one of the EGMs, in a base that supports an EGM, or in another suitable location with the cables running from the GMIs of adjacent EGMs to a common bridge box.

A conventional bonus controller 16 is connected directly to some of the bridges 14 and may communicate over the network to any of the EGMs so connected in the network. Note that the bridges may communicate via an Ethernet protocol through the bonus controller or may bypass the bonus controller as shown for bridge 14 in the middle group of EGMs in FIG. 1. In addition, bridges 14 can be connected in a daisy chain configuration, as shown via Ethernet link 17 in FIG. 1. The bonus controller 16 generally communicates through a non-SAS protocol, such as another well-known communication protocol known as GSA. GSA is typically carried over an Ethernet network, and thus the bonus controller 16 includes an Ethernet transceiver, which is described with reference to FIG. 3 below. Because the bonus controller 16 communication may be Ethernet based, a switch 18 may be used to extend the number of EGMs that may be coupled to the bonus controller 16. The bonus controller 16 and/or the bridge 14 may create or convert data or information received according to a particular protocol, such as SAS, into data or information according to another protocol, such as GSA. In this way the bridge 14 and bonus controller 16 are equipped to communicate, seamlessly, between any EGM 10 and gaming network 11 no matter which communication protocols are in use. Further, because the bridge 14 and bonus controller 16 are programmable, and include multiple extensible communication methods, as described below, they are capable of communicating with EGMs 10 that will communicate using protocols and communication methods developed in the future. The functions implemented by any of the controllers or processors mentioned herein might be distributed among a plurality of controllers or processors.

Other games or devices on which games may be played are connected to the gaming network using other connection and/or communication methods. For instance, a player kiosk 20 may be directly coupled to the gaming network. The player kiosk 20 allows players, managers, or other personnel to access data on the gaming network 11, such as a player tracking record, and/or to perform other functions using the network. For example, a player may be able to check the current holdings of the player account, transfer balances, redeem player points for credits, cash, or other merchandise or coupons, such as food or travel coupons, for instance.

A wireless transceiver 22 couples the gaming network 11 to a wireless EGM 24, such as a handheld device, or, through a cell phone or other compatible data network, the transceiver 22 connects to a cellular phone 26. The cellular phone 26 may be a "smart phone," which in essence is a handheld computer capable of playing games or performing other functions on the gaming network 11, as described in some embodiments of the invention.

The gaming network 11 also couples to the internet 28, which in turn is coupled to a number of computers, such as the personal computer 30. The personal computer 30 may be used much like the kiosk 14, described above, to manage player tracking or other data kept on the gaming network 11. More likely, though, is that the personal computer 30 is used to play actual games in communication with the gaming network 11. Player data related to games and other functions performed on the personal computer 30 may be tracked as if the player were playing on an EGM 10.

In general, in operation, a player applies a starting credit into one of the games, such as an EGM 10. The EGM 10 sends data through its SAS or other data communication port through the GMI 12 and associated bridge 14 to the gaming network 11. Various servers 32 and databases 34 collect historical accounting information about the gameplay on the EGMs 10, such as wagers made and jackpots for example. And, as will be described in more detail, they may continue to provide some services for the EGMs while the present embodiments take over others of the services. As will also be described in more detail, this feature permits any of the services offered by a legacy system, including bonus controller 16, to be taken over by the present system, one at a time.

In addition, each EGM 10 may accept information from systems external to the EGM itself to cause the EGM 10 to perform other functions. For example, these external systems may drive the EGM 10 to issue additional credits to the player. In another example, a promotional server may direct the EGM 10 to print a promotional coupon on the ticket printer of the EGM.

The bonus controller 16 is structured to perform some of the above-described functions as well. For example, in addition to standard games on the EGM 10, the bonus controller 16 is structured to drive the EGM 10 to pay bonus awards to the player based on any of the factors, or combination of factors, related to the EGM 10, the player playing the EGM 10, particular game outcomes of the game being played, or other factors.

In this manner, the combination of the bonus controller 16 and bridges 14 are a sub-system capable of interfacing with each of the EGMs on a gaming network 11. As a result, each bridge 14 may gather data about the game, gameplay, or player, or other data on the EGM 10, and forward it to the bonus controller 16. The bonus controller 16 then uses such collected data as input and, when certain conditions are met, sends information and/or data to the EGM 10 to cause it to perform certain functions.

In a more detailed example, suppose a player is playing an EGM 10 coupled to the bridge 14 and the bonus controller 16 described above. The player inserts a player tracking card so the gaming network 11 knows the player identity. Bridge 14 also stores such identifying information, or perhaps stores only information that the player is a level-2 identified player, for instance. The bridge passes such information to bonus controller 16, which has been programmed to provide a welcome-back bonus to any level-2 player after he or she has played two games. Gameplay on the EGM 10 continues and, after the player plays two games, bonus controller 16 instructs EGM 10 to add an additional 40 credits to EGM 10 as the welcome-back bonus. Such monitoring and control of EGM 10 can occur in conjunction with, but completely separate from any player tracking or bonusing function that is already present on the gaming network 11. In other words, the bonus controller 16 may be set to provide a time-based bonus of 10 credits for every hour played by the player of the EGM 10. The above-described welcome-back bonus may be managed completely separately through the bonus controller 16 and bridge 14. Further, all of the actions on the EGM 10 caused by the bonus controller 16 are also communicated to the standard accounting, tracking, and other systems already present on the gaming network 11. Alternatively, the welcome-back bonus described above may be implemented on servers 32 along with other functions.

Figure 3:
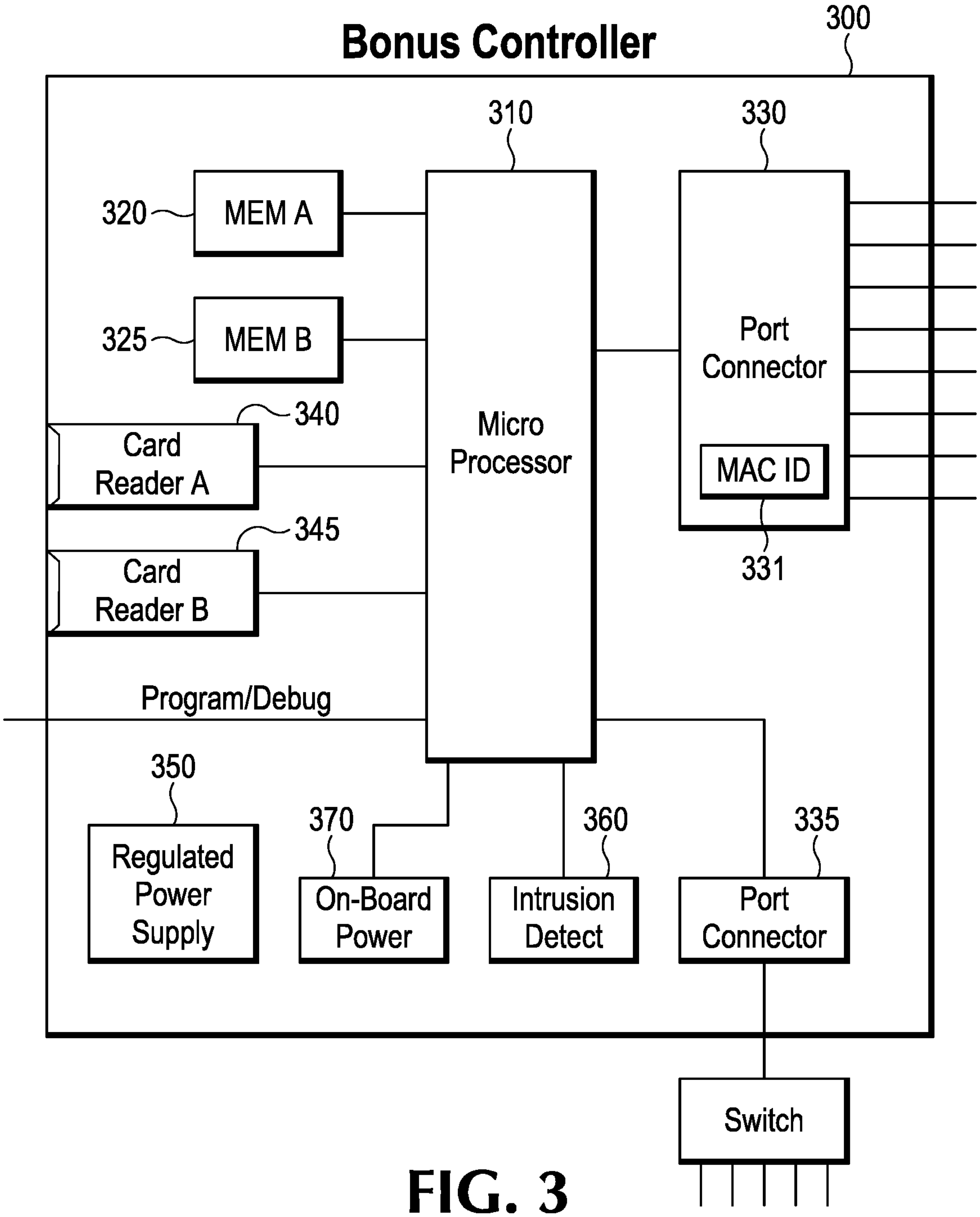
FIG. 3 is a block diagram of an example bonus controller shown in FIG. 1 according to embodiments of the system.

With reference back to FIG. 1, recall that the bonus controller 16 couples to each of the bridges 14, and by extension to their coupled EMGs to cause data and commands to be sent to the EGMs to control functions on each EGM. FIG. 3 is a detailed block diagram of such a bonus controller.

Consideration will now be given to the structure and operation of bonus controller 16 before providing a general overview of the operation of system 2. A bonus controller 300 of FIG. 3 may be an embodiment of the bonus controller 16 illustrated in FIG. 1. Central to the bonus controller 300 is a microprocessor 310, which may be an Atmel AT91SAM9G20, which is readily available to developers. The microprocessor 310 is coupled to one or more memory systems 320, 325. A memory system 320 is a 2 Megabyte FRAM while memory system 325 is a 64 Megabyte Synchronous DRAM (SDRAM). Each memory system 320, 325 has various advantages and properties and is chosen for those properties. FRAM maintains its data autonomously for up to ten years, while SDRAM is relatively fast to move data into and out of, as well as being relatively inexpensive. Of course, the sizes and types of memory included in any bonus controller according to embodiments of the invention may be determined by the particular implementation.

The microprocessor 310 also couples to a pair of card readers, 340, 345, which are structured to accept easily replaceable, portable memory cards, as are widely known. Each card reader may further include Electro-Static Discharge (ESD) devices to prevent damage to internal circuitry, such as the microprocessor 310, when cards are inserted or removed from the card readers 340, 345. In practice, a card in one of the card readers 340, 345 may store program code for the microprocessor 310 while a card in the other reader may store data for use by the bonus controller 300. Alternatively, a single card in either of the card readers 340, 345 may store both program and data information.

A port connector 330 includes multiple communication ports for communicating with other devices. The communication processor of each bridge 14 couples to a connected bonus controller through such a communication port. The communication port 330 is preferably an Ethernet interface, as described above, and therefore additionally includes a MAC address 331. The port connector 330 includes multiple separate connectors, such as eight, each of which connect to a single bridge 14 (FIG. 1), which in turn connects to up to eight separate EGMs 10. Thus, a single bonus controller 300 may couple to sixty-four separate EGMs by connecting through appropriately connected bridges.

Further, a second port connector 335 may be included in the bonus controller 300. The second port connector may also be an Ethernet connector. The purpose of the second port connector 335 is to allow additionally connectivity to the bonus controller 300. In most embodiments the second port connector 335 may couple to another bonus controller 300 or to other server devices, such as the server 60 on the gaming network 11 of FIG. 1. In practice, the second port connector 335 may additionally be coupled to a SMIB, thus providing the bonus controller 300 with the ability to directly connect to nine SMIBs.

Yet further, Ethernet connections are easily replicated with a switch, external to the bonus controller 300 itself, which may be used to greatly expand the number of devices to which the bonus controller 300 may connect.

Because the bonus controller 300 is intended to be present on gaming network 11, and may be exposed to the general public, systems to protect the integrity of the bonus controller 300 are included. An intrusion detection circuit 360 signals the processor 310 if a cabinet or housing that contains the bonus controller 300 is breached, even if no power is supplied to the bonus controller 300. The intrusion detection circuit may include a magnetic switch that closes (or opens) when a breach occurs. The microprocessor 310 then generates a signal that may be detected on the gaming network 11 indicating that such a breach occurred, so that an appropriate response may be made. An on-board power circuit 370 may provide power to the bonus controller 300 for a relatively long time, such as a day or more, so that any data generated by the processor 310 is preserved and so that the processor 310 may continue to function, even when no external power is applied. The on-board power circuit 370 may include an energy-storing material such as a battery or a large and/or efficient capacitor.

Similarly to the microprocessor processor 260 of the SAS processor 210 described above, the microprocessor 310 of the bonus controller 300 is additionally coupled to a program/debug port for initially programming the microprocessor 310 during production, and so that program and/or other data for the microprocessor may be updated through the program/debug port.

In operation the bonus controller 300 configures and controls bonus features on gaming devices through gaming network 11 or through other communication systems. Bonus features are implemented through each gaming device's internal structure and capabilities, and may include integration with additional peripheral devices. Bonusing programs for the connected games may be introduced to the bonus controller 300 by updating data stored in the memory systems directly on the bonus controller, or by inserting new memory cards in one or more of the card readers 340, 345. Such a platform provides a facility for game developers, even third-party developers, to define and program new types of bonus games that may be used in conjunction with existing EGMs on existing gaming networks, or on new games and new networks as they are developed.

Figure 2:
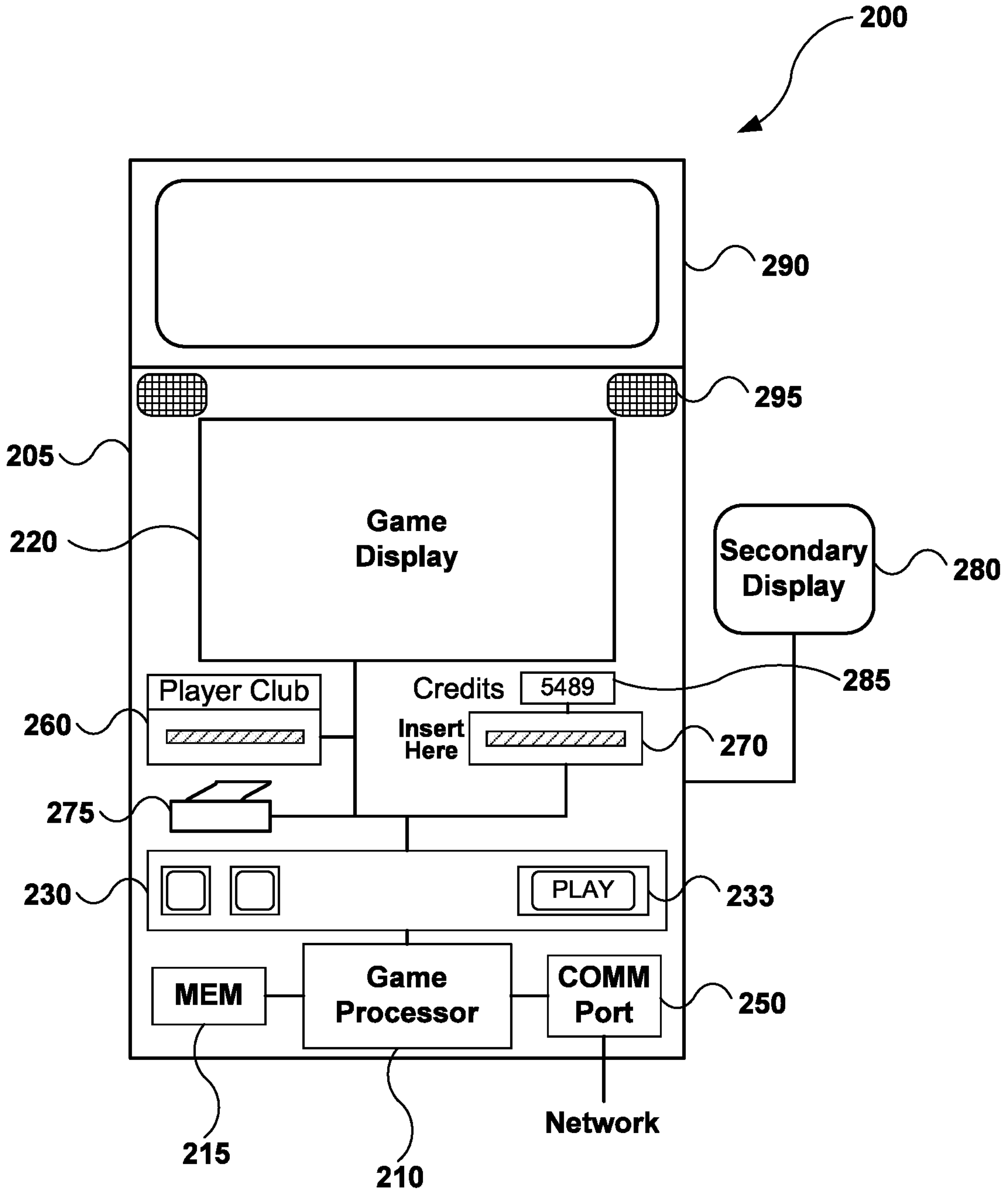
FIG. 2 is a functional block diagram that illustrates an example gaming device that can be a part of the gaming system shown in FIG. 1.

Before providing an overview of the system of embodiments disclosed herein, consideration will first be given to a typical electronic gaming machine that can be incorporated into the new system. FIG. 2 is a functional block diagram that illustrates an example electronic gaming machine (EGM). These EGMs may include all types of electronic gaming machines, such as physical reel slot machines, video slot machines, video poker gaming devices, video blackjack machines, keno games, and any other type of devices may be used to wager monetary-based credits on a game of chance.

The illustrated gaming device 200 includes a cabinet 205 to house various parts of the gaming device 200, thereby allowing certain components to remain securely isolated from player interference, while providing access to player input/output devices so that the player may interact with the gaming device. The securely housed components include the game processor 210, memory 215, and connection port 250. The game processor 210, depending on the type of gaming device 200, may completely or partially control the operation of the gaming device. For example, if the gaming device 200 is a standalone gaming device, game processor 210 may control virtually all the operations of the gaming device and attached equipment. In other configurations, the game processor 210 may implement instructions generated by or communicated from a remote server or another controller. For example, the game processor 210 may be responsible for running a base game of the gaming device 200 and executing instructions received over the network from a bonus server or player tracking server. In a server-based gaming environment, the game processor 210 may simply act as a terminal to perform instructions from a remote server that is running game play on the gaming device 200. The functions implemented by the processor might also be distributed among several processors.

The memory 215 is connected to the game processor 210 and may be configured to store various game information about gameplay or player interactions with the gaming device 200. This memory may be volatile (e.g., RAM), non-volatile (e.g., flash memory), or include both types of memory. The connection port 250 is also connected to the game processor 210. This connection port 250 typically connects the gaming device 200 to a gaming network. The connection port 250 may be structured as a serial port, parallel port, Ethernet port, optical connection, wireless antenna, or any other type of communication port used to transmit and receive data. Although only one connection port 250 is shown in FIG. 2, the gaming device 200 may include multiple connection ports. Virtually all gaming machines, however, permit transfers of cash or promotional credits between the slot accounting system and the machine via a single designated port. As described above, in many existing gaming devices, this connection port 250 is a serial connection port utilizing a SAS protocol to communicate to one or more remote game servers, such as player tracking servers, bonus servers, accounting servers, etc.

The player input/output devices housed by the gaming cabinet 205 further include a bill/ticket reader 270, a credit meter 285, and one or more game speakers 295. Various gaming devices may include fewer or more input/output devices (e.g., a game handle, a coin acceptor, a coin hopper, etc.) depending upon the configuration of the gaming device.

The gaming display 220 may have mechanical spinning reels, a video display, or include a combination of both spinning reels and a video display, or use other methods to display aspects of the gameplay to the player. If the gaming display 220 is a video display, the gaming display may include a touch screen to further allow the player to interact with game indicia, soft buttons, or other displayed objects. The button panel 230 allows the player to select and place wagers on the game of chance, as well as allowing the player to control other aspects of gaming. For example, some gaming devices allow the player to press one of buttons 233 to signal that he or she requires player assistance. Other buttons may bring up a help menu and/or game information. The buttons 233 may also be used to play bonuses or make selections during bonus rounds.

Ticket printers 275 have relatively recently been included on most gaming devices to eliminate the need to restock coin hoppers and allow a player to quickly cash-out credits and transfer those credits to another gaming device. The tickets can also typically be redeemed for cash at a cashier cage or kiosk. The ticket printers are usually connected to the game processor and to a remote server, such as a TITO server to accomplish its intended purpose. In gaming devices that have more than one peripheral device, and which include only a single SAS port, the peripheral devices all share communication time over the connection port 250.

Another peripheral device that often requires communication with a remote server is the player club interface device 260. The player club interface device 260 may include a reader device and one or more input mechanisms. The reader is configured to read an object or indicia identifying the player. The identifying object may be a player club card issued by the casino to a player that includes player information encoded on the card. Once the player is identified by a gaming device, the player club interface device 260 communicates with a remote player server through the connection port 250 to associate a player account with the gaming device 200. This allows various information regarding the player to be communicated between the gaming device 200 and the player server, such as amounts wagered, credits won, and rate of play. In other embodiments, the card reader may read other identifying cards (such as driver licenses, credit cards, etc.) to identify a player. Although FIG. 2 shows the reader as a card reader, other embodiments may include a reader having a biometric scanner, PIN code acceptor, or other methods of identifying a player to pair the player with their player tracking account. As is known in the art, it is typically advantageous for a casino to encourage a player to join a player club since this may inspire loyalty to the casino, as well as give the casino information about the player's likes, dislikes, and gaming habits. To compensate the player for joining a player club, the casino often awards player points or other prizes to identified players during game play.

Other input/output devices of the gaming device 200 include a credit meter 285, a bill/ticket acceptor 270, and speakers 295. The credit meter 285 generally indicates the total number of credits remaining on the gaming device 200 that are eligible to be wagered. The credit meter 285 may reflect a monetary unit, such as dollars, or an amount of credits, which are related to a monetary unit, but may be easier to display. For example, one credit may equal one cent so that portion of a dollar won can be displayed as a whole number instead of decimal. The bill/ticket acceptor 270 typically recognizes and validates paper bills and/or printed tickets and causes the game processor 210 to display a corresponding amount on the credit meter 285. The speakers 295 play auditory signals in response to game play or may play enticing sounds while in an "attract-mode," when a player is not at the gaming device. The auditory signals may also convey information about the game, such as by playing a particularly festive sound when a large award is won.

The player may initially insert monetary bills or previously printed tickets with a credit value into the bill acceptor 270. The player may also put coins into a coin acceptor (not shown) or a credit, debit, or casino account card into a card reader/authorizer (not shown). In other embodiments, stored player points or special 'bonus points' awarded to the player or accumulated and/or stored in a player account may be able to be substituted at or transferred to the gaming device 200 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the way wager value-input is accomplished.

The gaming device 200 may include various other devices to interact with players, such as light configurations, top box displays 290, and secondary displays 280. The top box display 290 may include illuminated artwork to announce a game style, a video display (such as an LCD), a mechanical and/or electrical bonus display (such as a wheel), or other known top box devices. The secondary display 280 may be a vacuum fluorescent display (VFD), a liquid crystal display (LCD), a cathode ray tube (CRT), a plasma screen, or the like. The secondary display 280 may show any combination of primary game information and ancillary information to the player. For example, the secondary display 280 may show player tracking information, secondary bonus information, advertisements, or player selectable game options. The secondary display may be attached to the game cabinet 205 or may be located near the gaming device 200. The secondary display 280 may also be a display that is associated with multiple gaming devices 200, such as a bank-wide bonus meter, or a common display for linked gaming devices.

In operation, typical play on a gaming device 200 commences with a player placing a wager on a game to generate a game outcome. In some games, a player need not interact with the game after placing the wager and initiating the game, while in other games, the player may be prompted to interact with the gaming device 200 during game play. Interaction between the player and the gaming device 200 is more common during bonuses, but may occur as part of the game, such as with video poker. Play may continue on the gaming device 200 until a player decides to cash out or until insufficient credits remain on the credit meter 285 to place a minimum wager for the gaming device.

Before going into detail about the structure and operation of bridge 14 and gaming machine interface 12—as well as a detailed description of the overall operation of system 2—consideration will first be given to a high-level view of the operation of system 2. As mentioned above, prior art systems for providing services to and management functions for networked gaming machines suffer from a number of problems. One of the ways system 2 addresses these problems is by providing the services, such as TITO, dispatch, bonuses, etc. from the bridge circuit as opposed to a server in a secure IT room.

TITO services are described in U.S. Pat. Nos. 5,265,874; 5,290,033; 6,048,269; and 6,729,957, all of which are incorporated herein by reference. Dispatch services are described in US Patent Application Publication 2017/0186270, which is also incorporated by reference.

As will be discussed in detail, each bridge circuit has a SAS processor and a network processor. The SAS processor handles SAS communications, which is a commonly used protocol for communicating via a gaming machine port. The network processor handles communication between and among the bridges, the bonus controller—and any other devices connected to network 11—and ultimately to the servers 32 and databases 34. When all services, such as TITO, dispatch, bonuses, etc., are implemented by processes on bridge 14, servers 32 function only to collect and store (in databases 34) historical data sent from flash memory in each bridge. This is in contrast to prior art systems in which the processes that provide various services to the EGMs are located on the servers in a secure room.

The SAS processor in bridge 14 communicates with a SAS port on the EGM to which it is connected via GMI 12. The GMI converts signals from the SAS port of the EGM to the commonly used RS232 standard for two-way serial communication over a USB connection to bridge 14. The bridges, bonus controller, switches, (like switch 18 in FIG. 1), and all the other devices, including servers 32, communicate with one another via the Ethernet protocol. The bridge includes a network processor that communicates with both the SAS processor in the bridge, via USB, and with network 11, via Ethernet, to relay information to and from the SAS processor.

In operation, bridge 14 conducts high-speed polling to retrieve data that appears at the EGM SAS port. Unlike prior art systems, which typically poll only for EGM meter readings, bridge 14 requests and receives extensive information related to any activity on the EGM. For example, each actuation of a button on the EGM and each reel stop during display of a game outcome are collected, each with its own time stamp. The collected data is stored in a flash memory contained in bridge 14, and is also sent to flash memory in each of two additional bridges, which functions as a backup system. One manner in which the collected data can be used is described in applicant's U.S. Pat. No. 10,553,072 issued on Feb. 4, 2020, invented by John Acres, which patent is incorporated herein by reference for all purposes.

Computer programs that provide the various services, such as TITO cashless tickets, progressive jackpots, player tracking, and other services are run on the SAS processor or on network processor 42. Although all required services may be run by the bridge, if a legacy system that includes a suite of programs to provide services remains in place, selected services can be run on the bridge while letting other of the services continue to be run by the legacy system. This permits the present system to take over services provided by one or more other vendor systems one at a time, if that is desired. Ultimately, the bridge can take over all management and EGM services.

The bridge has a robust power management system, including large capacitors that provide several functions. First, in the event of a brownout, a power failure that lasts less than about 30 seconds, all power to bridge 14 and GMI 12 is supplied from the capacitors. As a result, all no functionality is lost during the brownout. Second, in the event of a longer outage, data for transactions in process are stored, and when power is resumed the transaction is properly completed. Third, the SAS processor can run for as many as three days in the event power is lost. This enables the processor to continue to monitor box (not shown) in which bridge 14 resides for tampering during a prolonged power outage. Fourth, if cable 13, which connects bridge 14 with one of its associated GMIs 12, is unplugged, GMI 12 is supplied with power via a capacitor that permits an orderly shutdown of GMI 12 to preserve data in a current transaction.

The software programs in the bridge have high-speed access to data as soon as it is stored in the flash memory. The software programs may be provided by the owner of the hardware system described herein or by third parties. Because the hardware and its functionality will already be approved by gaming regulators, third-party developers of new software services for EGMs can gain ready approval for features provided by the new services. Put differently, a third-party developer need only gain approval of its software and the services it provides, rather than having to gain regulatory approval for hardware or interfaces with the system. This will enable small or even individual developers to create bonus games or other new services without the need to develop hardware and obtain extensive regulatory approval.

Alternatively, data is rapidly moved upstream from the flash memory to a repository managed by a server where specialized software captures, indexes, and correlates real-time, machine-generated data. Software sockets are used to monitor specific data in the repository. As a result, the repository can be used by third parties, each of whom are granted secure access, to implement any of the services that might be required on the casino floor, including bonus games, progressive jackpots, TITO services, accounting and reports, etc. The present system can provide data in the repository within a typical range of about 50-150 milliseconds from the time the event occurs on the gaming machine. This contrasts with prior art systems that provide data, but not all of the data, to a data base where the lag time from the event on the machine to appearance in the database is typically in the range of 1-3 seconds. This delay prevents or impairs implementing robust services using the prior art systems.

One software tool for capturing and making available real-time, machine-generated data in a Web-style interface is branded as Splunk, which is made by Splunk, Inc.

Security is maintained via a novel system of manufacturing and venue certificates and tokens as well as a tamper-proof feature for each bridge box.

Figure 4A:
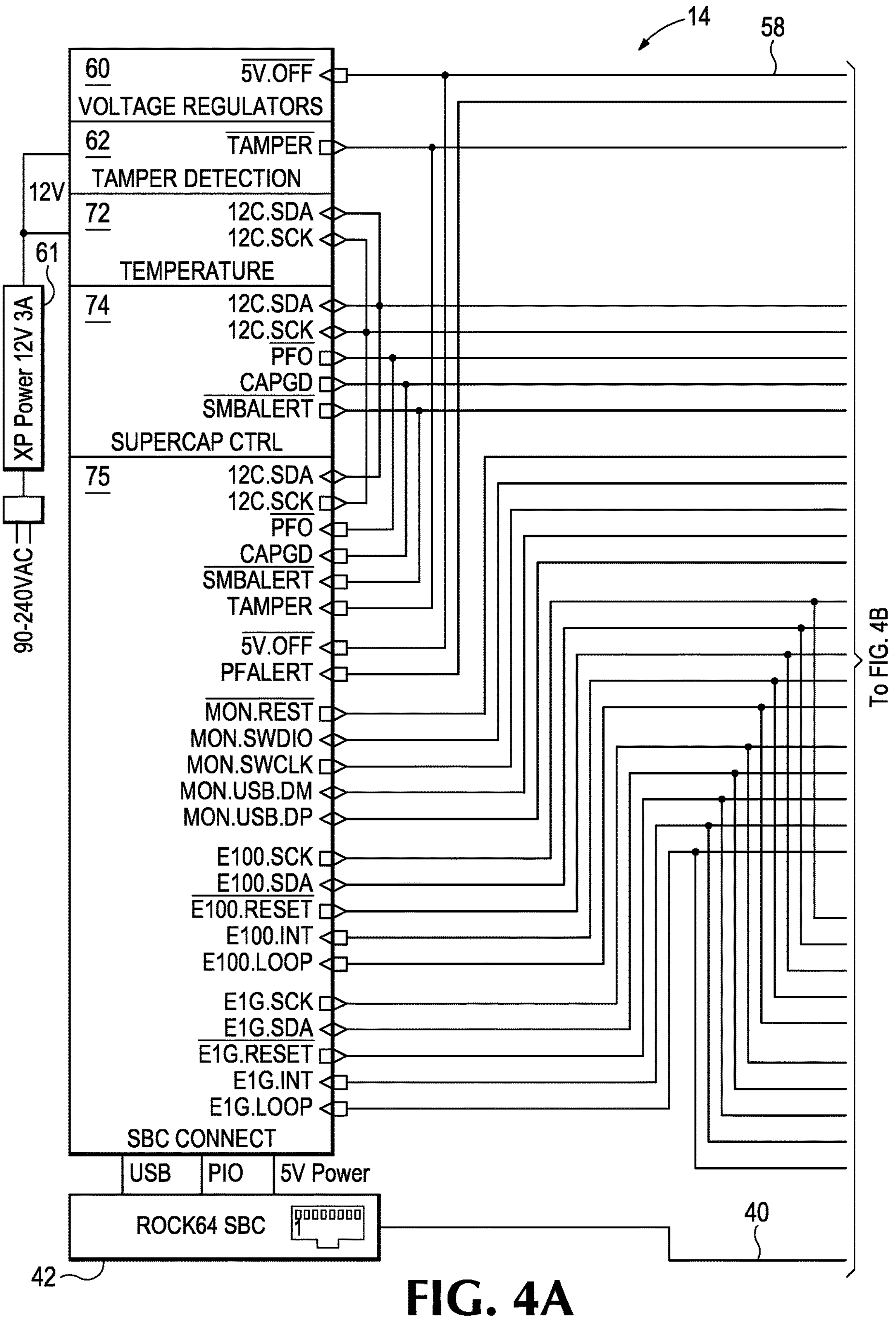
FIGS. 4A and 4B together show a block diagram of the key components on the bridge shown in FIG. 1 for present embodiments of the system showing the main connections between each of the key components on the bridge.
Figure 4B:
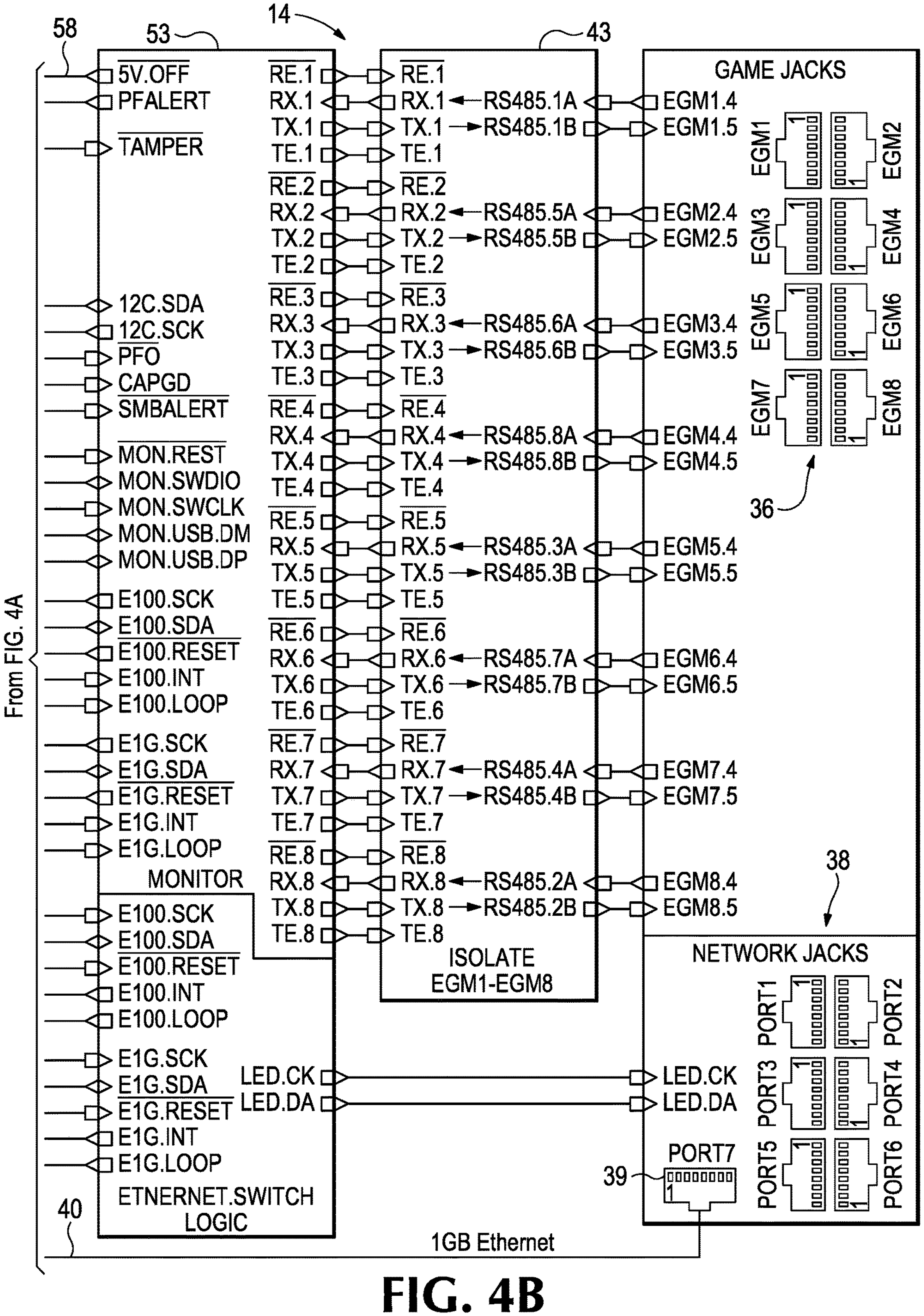

Consideration will now be given to the bridge hardware devices and how they are connected to one another. In FIGS. 4A and 4B, a block diagram illustrates the various components and functionality provided by the bridge. Additional detail will be provided in later description and drawings for some of these, which are shown only generally in the FIG. 4 overview.

Bridge circuit 14 in FIG. 4B includes 8 game jacks, indicated generally at 36 in FIG. 4B. Each of the game jacks is a receptacle for an RJ45 jack. Cable 13 (in FIG. 1), which is not shown in FIGS. 4A and 4B, connects each GMI 12 to its associated bridge 14 via RJ45 plugs on either end of the cable. Each GMI 12 is in turn connected to a SAS port on its associated EGM as will be later described in more detail. Each of gaming jacks 36 includes pins to accommodate RS245 serial communications as well as pins to accommodate 100 MB Ethernet communications between GMI 13 and bridge 14. The Ethernet connection is not used in the current implementations but may be used to extend the bridge to control a variety of other devices that are on or could be added to the EGM, e.g., a bonus game or a player-tracking unit.

Figure 7A:
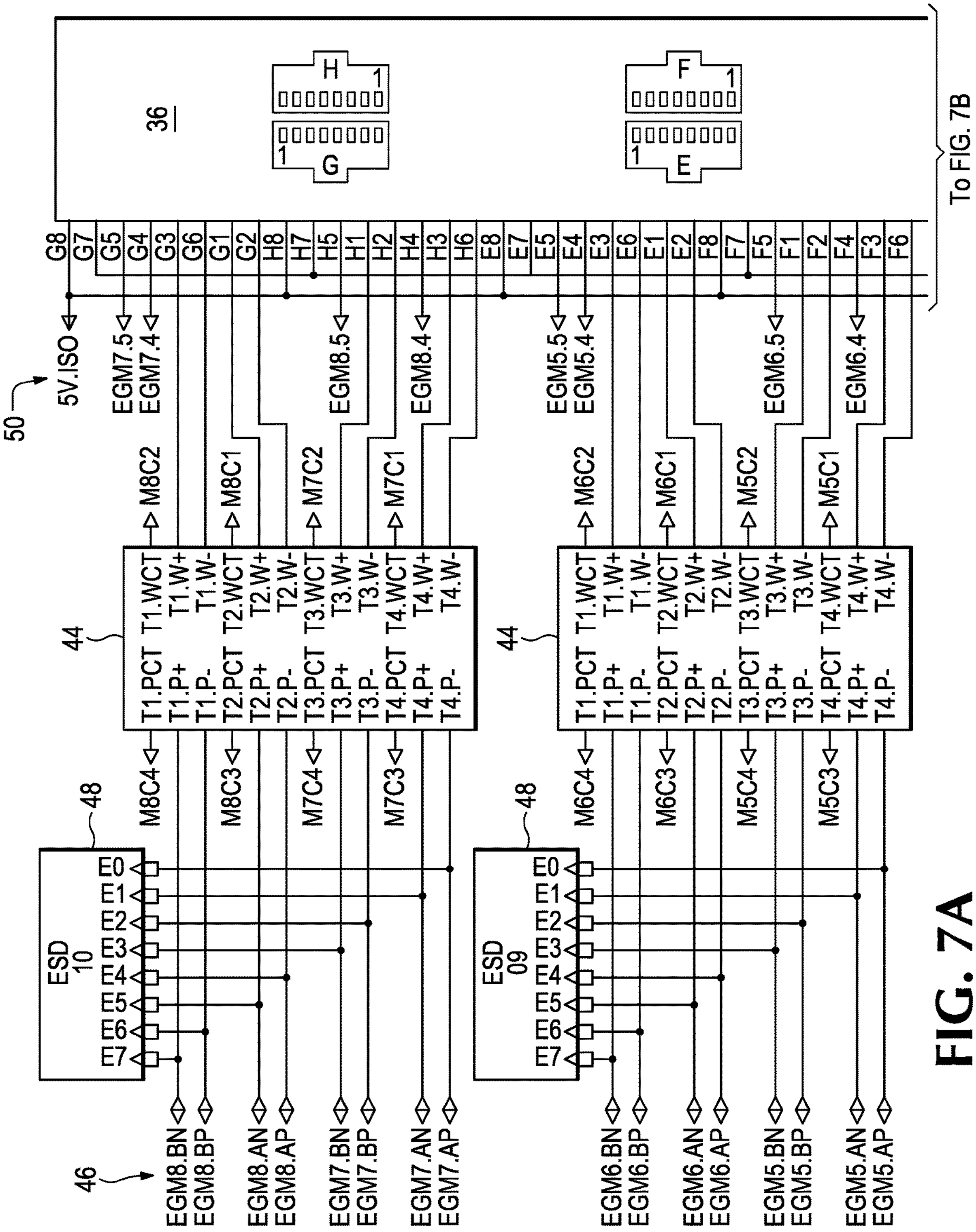
FIGS. 7A and 7B illustrate the game jacks (and related components) shown in FIG. 4B.
Figure 7B:
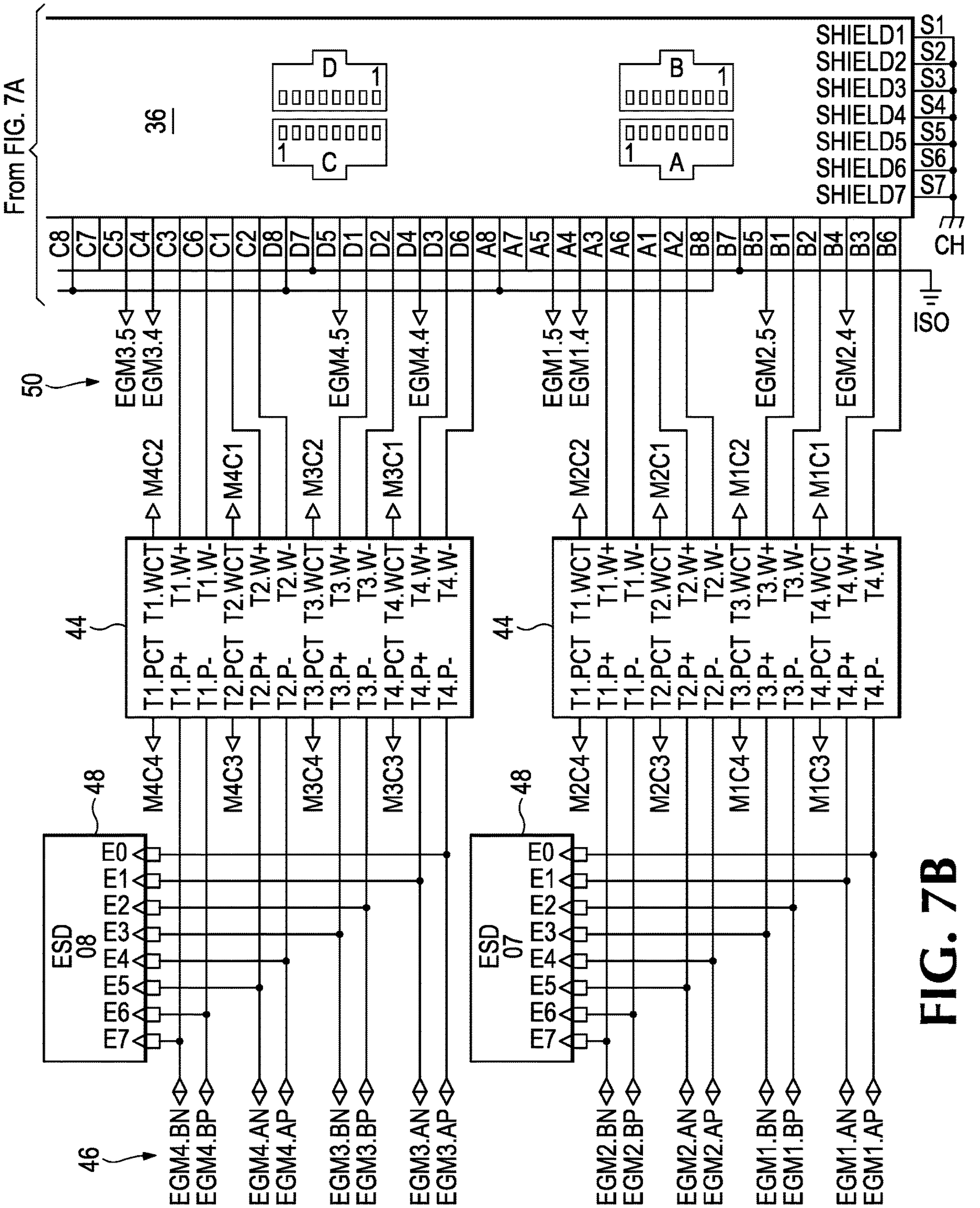
Figure 8:
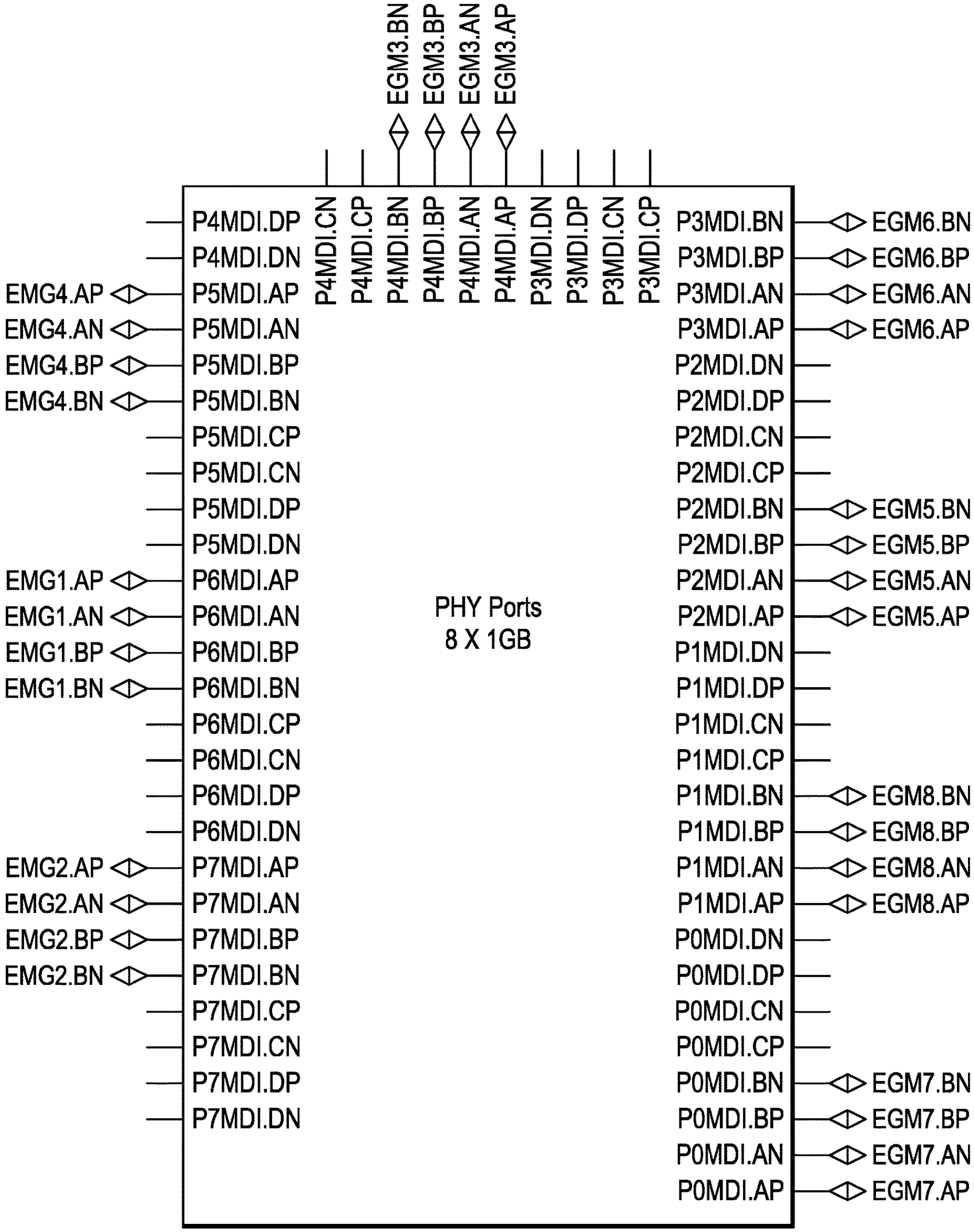
FIG. 8 depicts an Ethernet switch, not shown in FIGS. 4A and 4B, that is used to control signals on the game jacks of FIGS. 7A and 7B.

Considering game jacks in more detail, attention is directed to FIGS. 7A and 7B. Each of game jacks 36 is connected to an Ethernet transformer 44, each transformer handling communications to and from 2 EGMs. In the present embodiments, each Ethernet transformer is manufactured by Halo Electronics and identified by Part Number TG111-MSC13LF. The Ethernet 100 MB signal lines for each EGM are shown generally at 46 and are available for expansion of services to the EGM via Ethernet communications, as previously mentioned, but are not connected in the present embodiments. Electrostatic discharge protection for Ethernet signal lines 46 is provided by components 48. Each of game jacks 36 also includes signal lines indicated generally at 50 to accommodate the RS245 signals from the GMI that the game jack is connected to. These are the signal lines that carry SAS data from the EGM. Each EGM has 2 signal lines, e.g., EGM3 in FIG. 7B has lines labeled EGM3.5 and EGM3.4 to indicate the third of eight potential EGM connections to bridge 14, with the connections being on pins 4 and 5 of each jack. Each of the other 7 EGM connections are similarly labeled. Each of the EGM RS245 signal lines is connected to a galvanic isolation circuit 43 in FIG. 4B and each line bears the same label in FIG. 4B as in FIGS. 7A and 7B.

The network jacks, indicated generally at 38 in FIG. 4B, are used to connect the bridge to network 11 via an Ethernet connection. In addition, there is a jack 39 in FIG. 4B that is one end of a connection that is internal to bridge 14, which will be shortly described. The network jacks 38 may be used in a variety of ways. Two of the jacks are connected to the network to provide redundancy in the event that communication over one of the connections is impaired. One jack could be used to connect to a peripheral device, such as bonus controller 16 in FIG. 1. In addition, bridges 14 can be daisy chained together to facilitate communications with network 11, also shown in FIG. 1.

Figure 10A:
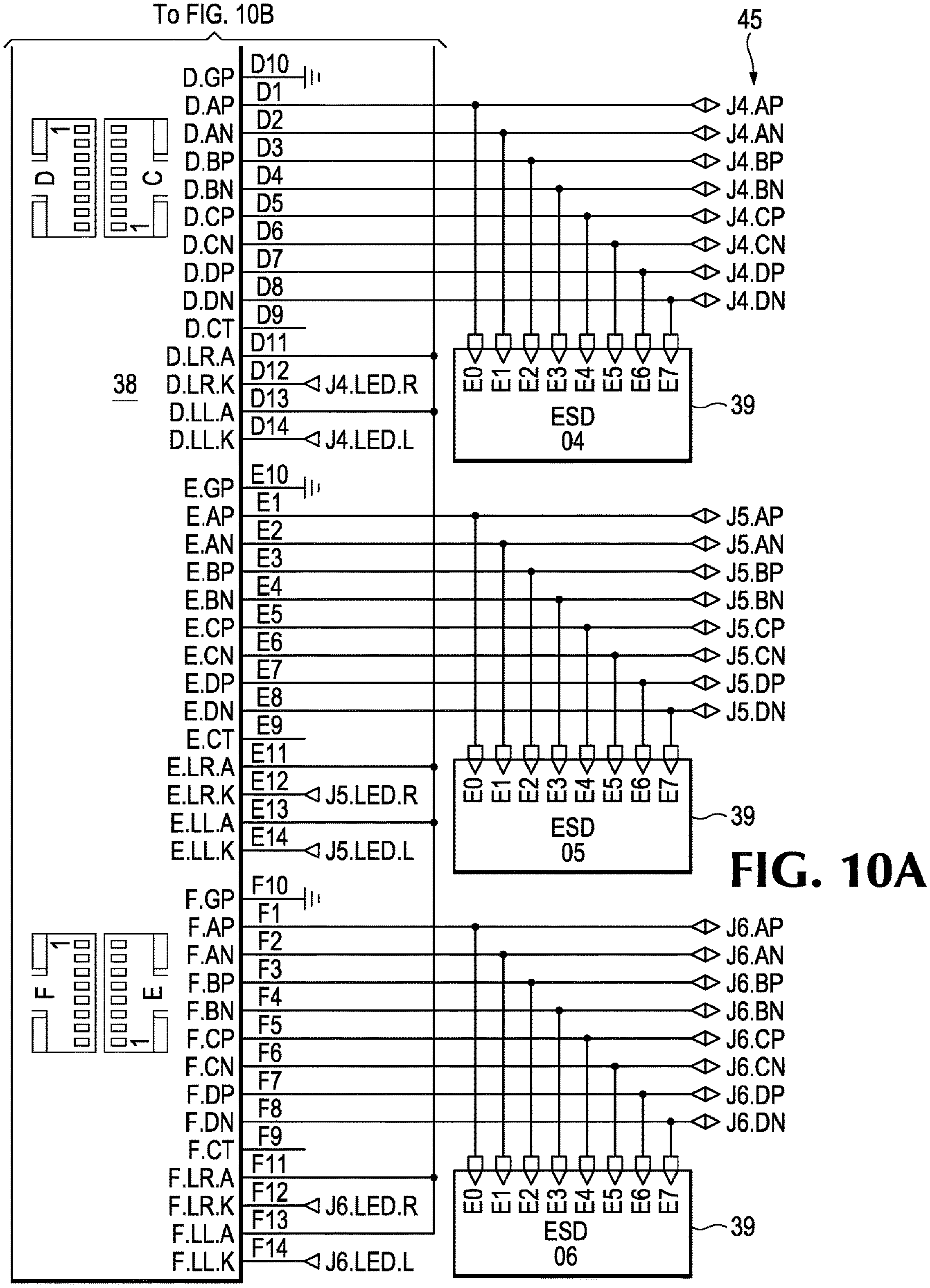
FIGS. 10A, 10B, and 11 depict the network jacks of FIG. 4B.
Figure 10B:
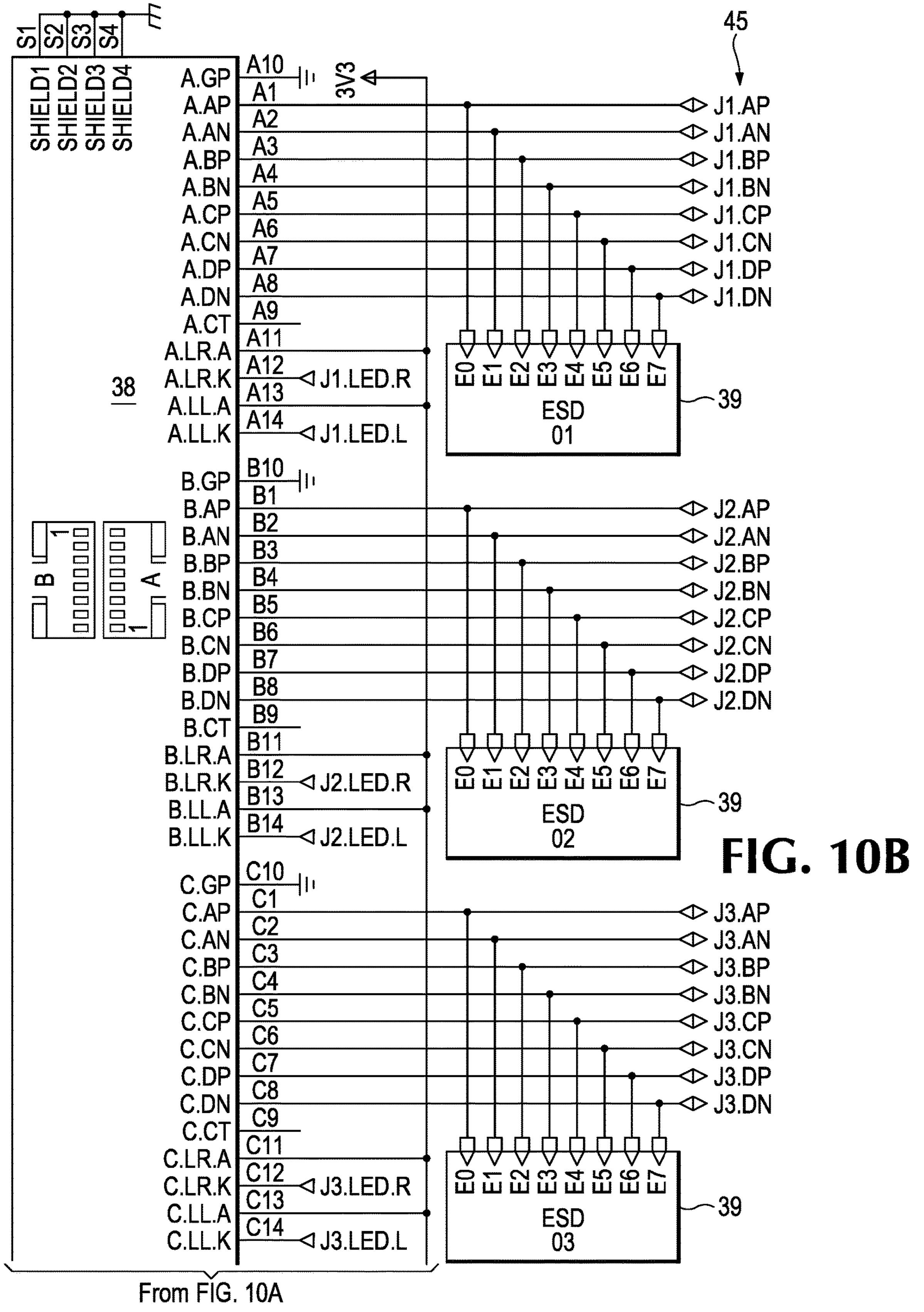

Considering the network jacks 38 in more detail, in FIGS. 10A and 10B, show all 6 jacks labeled A through F. Each of the jack lines internal to bridge 14 are connected to electrostatic protection devices 39. Each of the lines are labeled as shown at 45. These lines connect to a correspondingly labeled pin on an Ethernet switch in FIG. 13.

Figure 11:
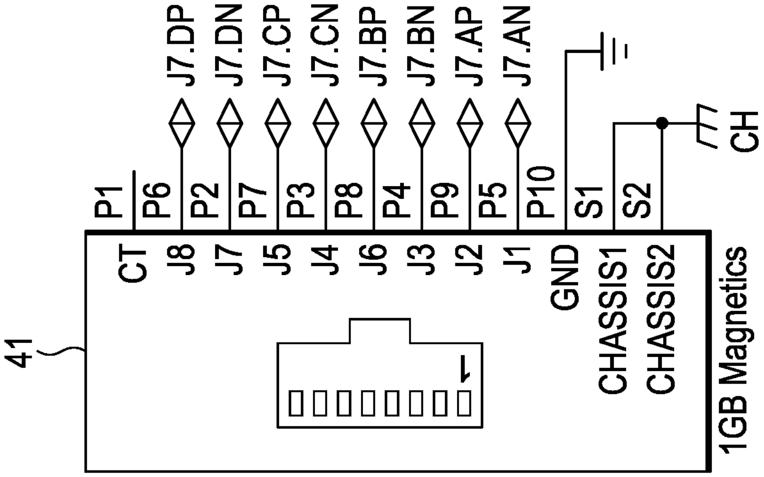
Figure 13:
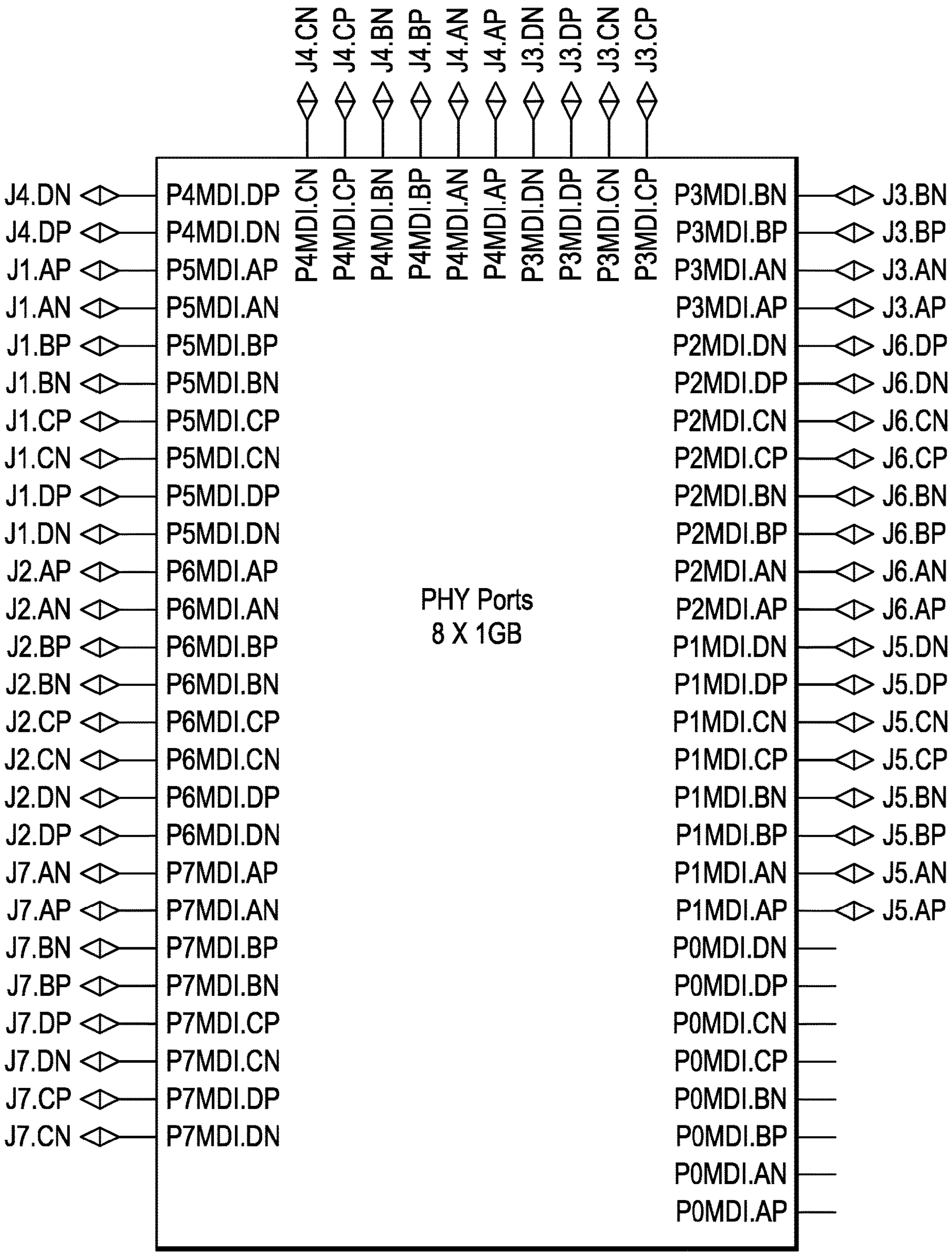
FIG. 13 depicts an Ethernet switch, not shown in FIGS. 4A and 4B, that is used to control signals on the network jacks shown in FIGS. 10A, 10B, and 11.

In addition, jack 39 (also shown in FIG. 4B), which is shown in more detail in FIG. 11, has internal lines labeled as shown that are connected to correspondingly labeled lines on the Ethernet switch of FIG. 13. Jack 39 is connected to one end of a cable 40, in FIGS. 4A and 4B. The other end of the cable is plugged into a jack that is provided on network processor 42 board. As a result, this cable connects the network processor to the network Ethernet switch, depicted somewhat schematically in FIGS. 4A and 4B.

Figure 12:
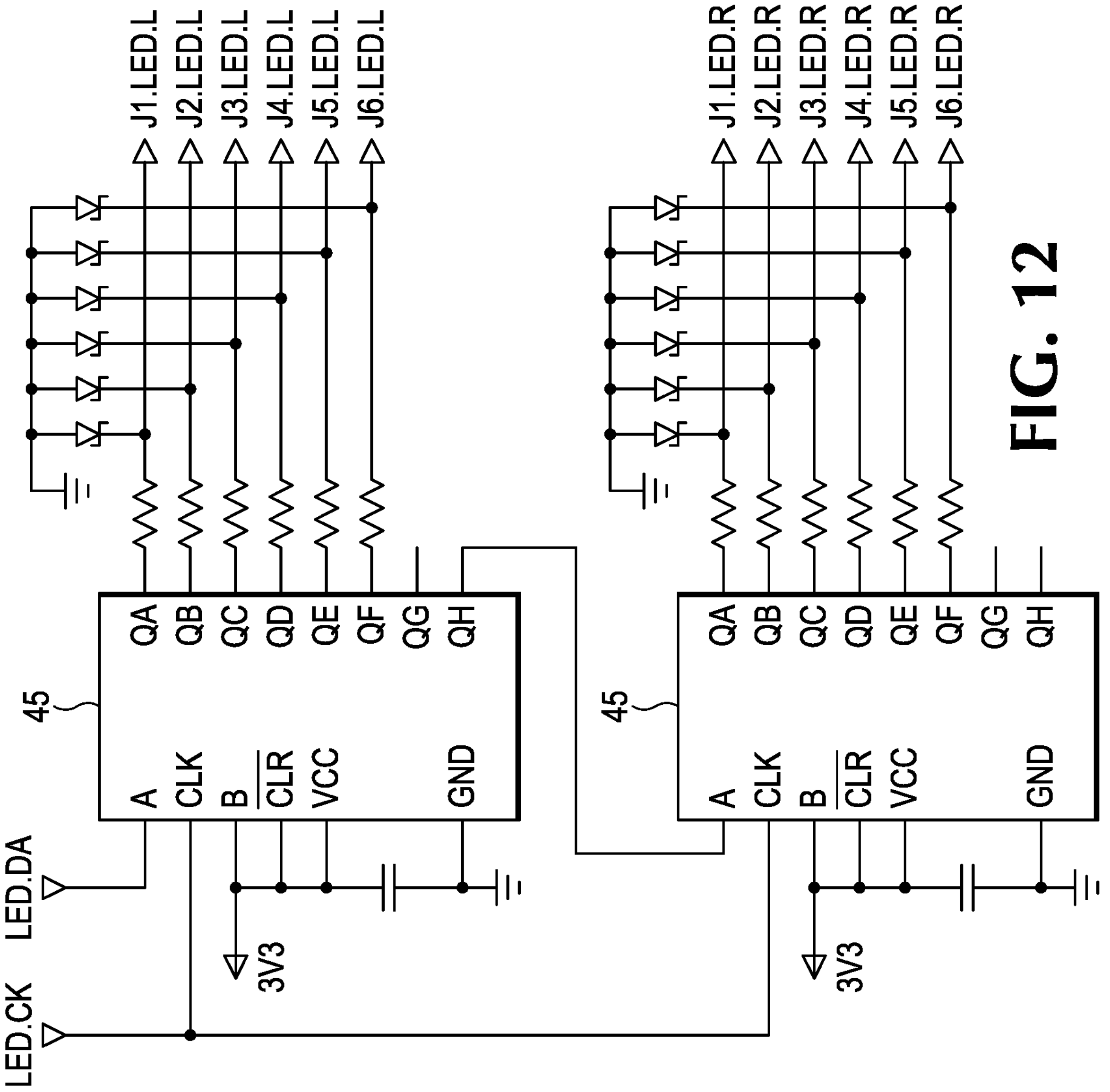
FIGS. 12 depicts serial drivers, not shown in FIGS. 4A and 4B, for LED indicators on the network jacks of FIGS. 10A, 10B, and 11.

In FIG. 12, shift registers 45 are connected to LEDs on each of network jacks 38 as shown. The shift registers also connect to lines LED.CK and LED.DA, which in turn are connected to the correspondingly labeled lines on an Ethernet switch controller 56 in FIG. 9C. These signals on these lines ultimately light LEDs on each network jack to indicate connection status and when data is moving over the connection.

In the present embodiments, network processor 42 is a credit-card size, 64-bit, single-board computer with both USB and Ethernet ports. The current embodiment uses the ROCK64 single-board computer manufactured by PINE64, but any suitable single-board computer could be used. As a result of these connections, data in the bridge is transmitted to and from the Ethernet switch in FIG. 13 and from there to and from network 11.

Figure 5A:
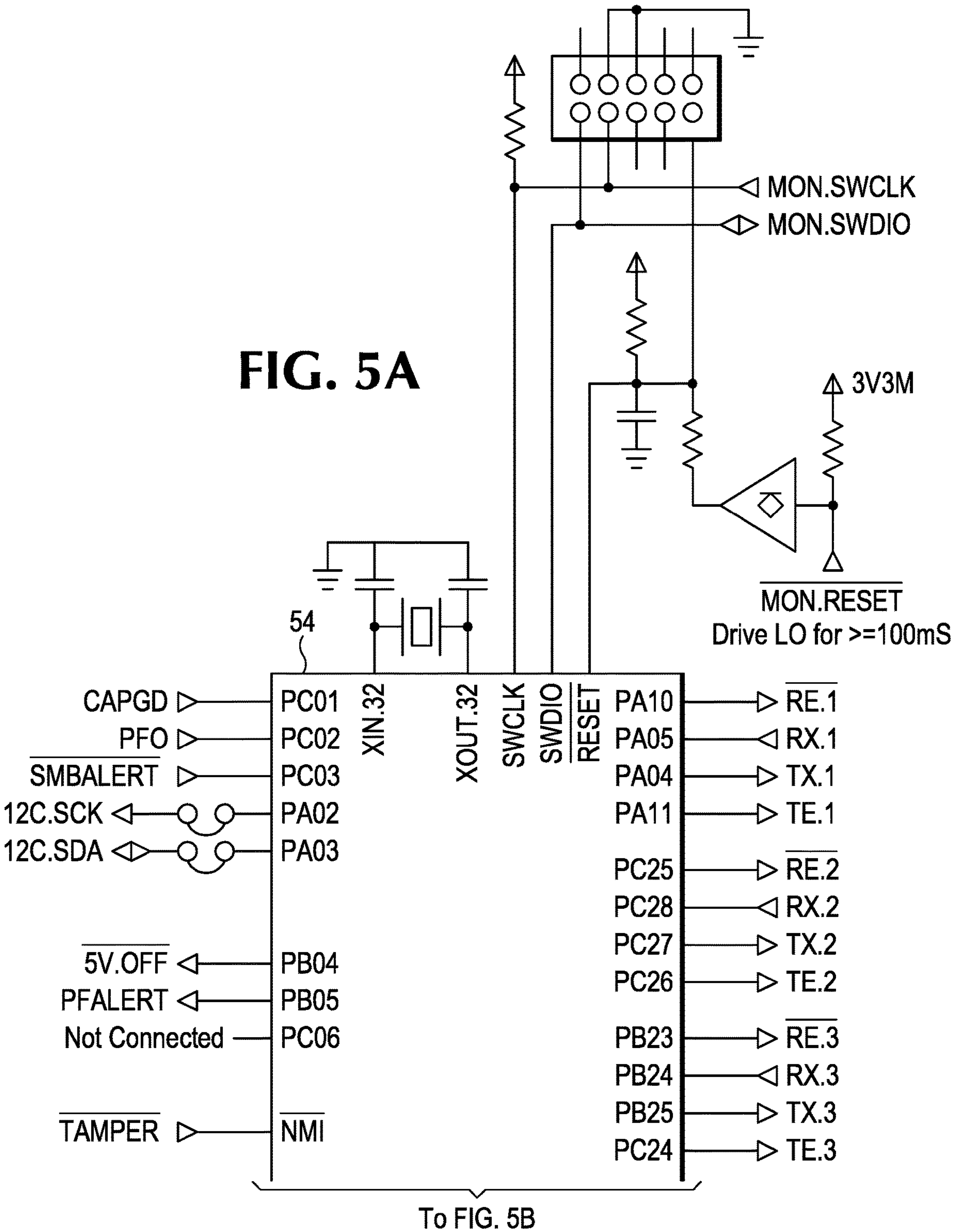
FIGS. 5A and 5B together depict the microcontroller shown in FIG. 4B, which monitors SAS communications and provides Ethernet switch logic.
Figure 5B:
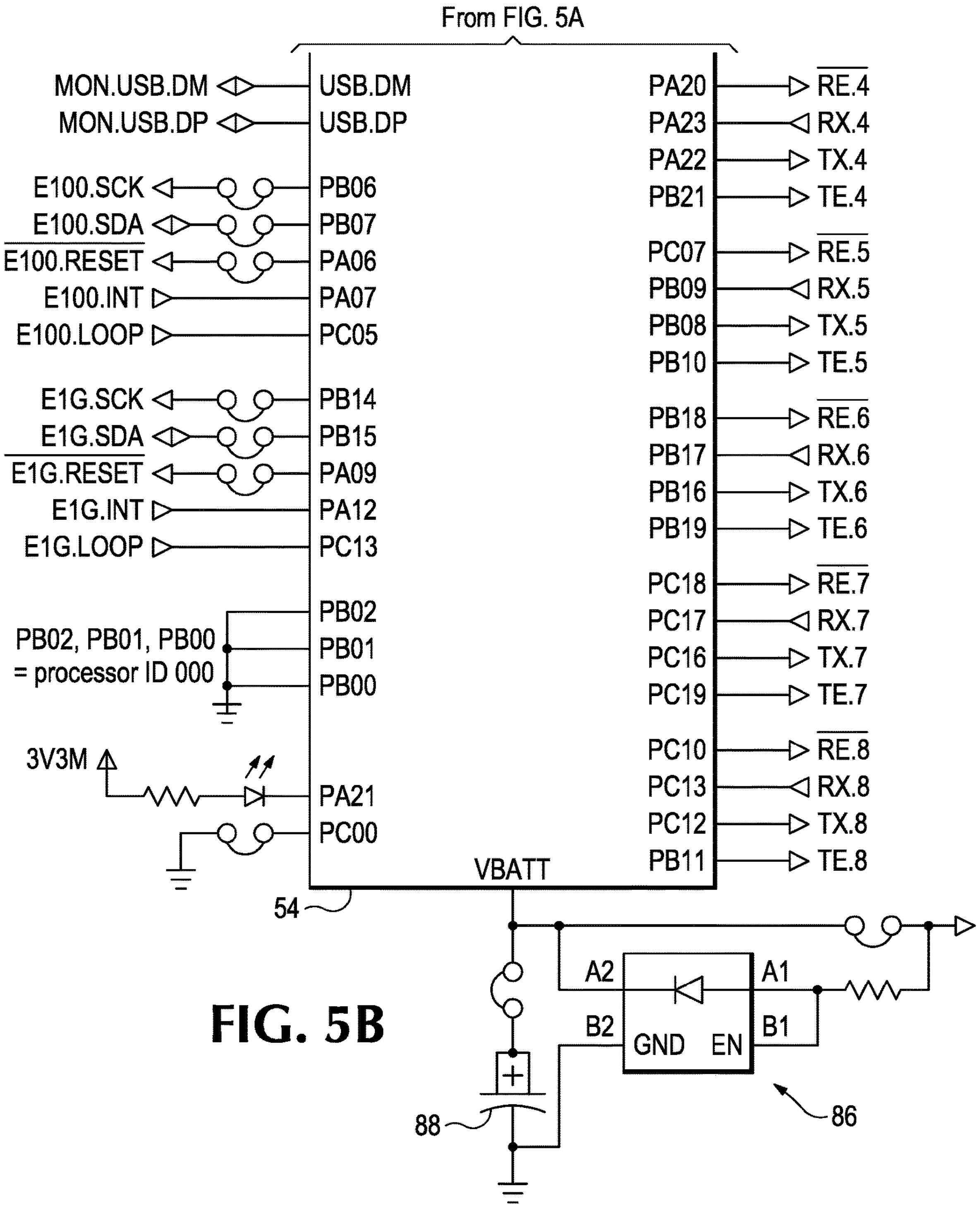
Figure 6:
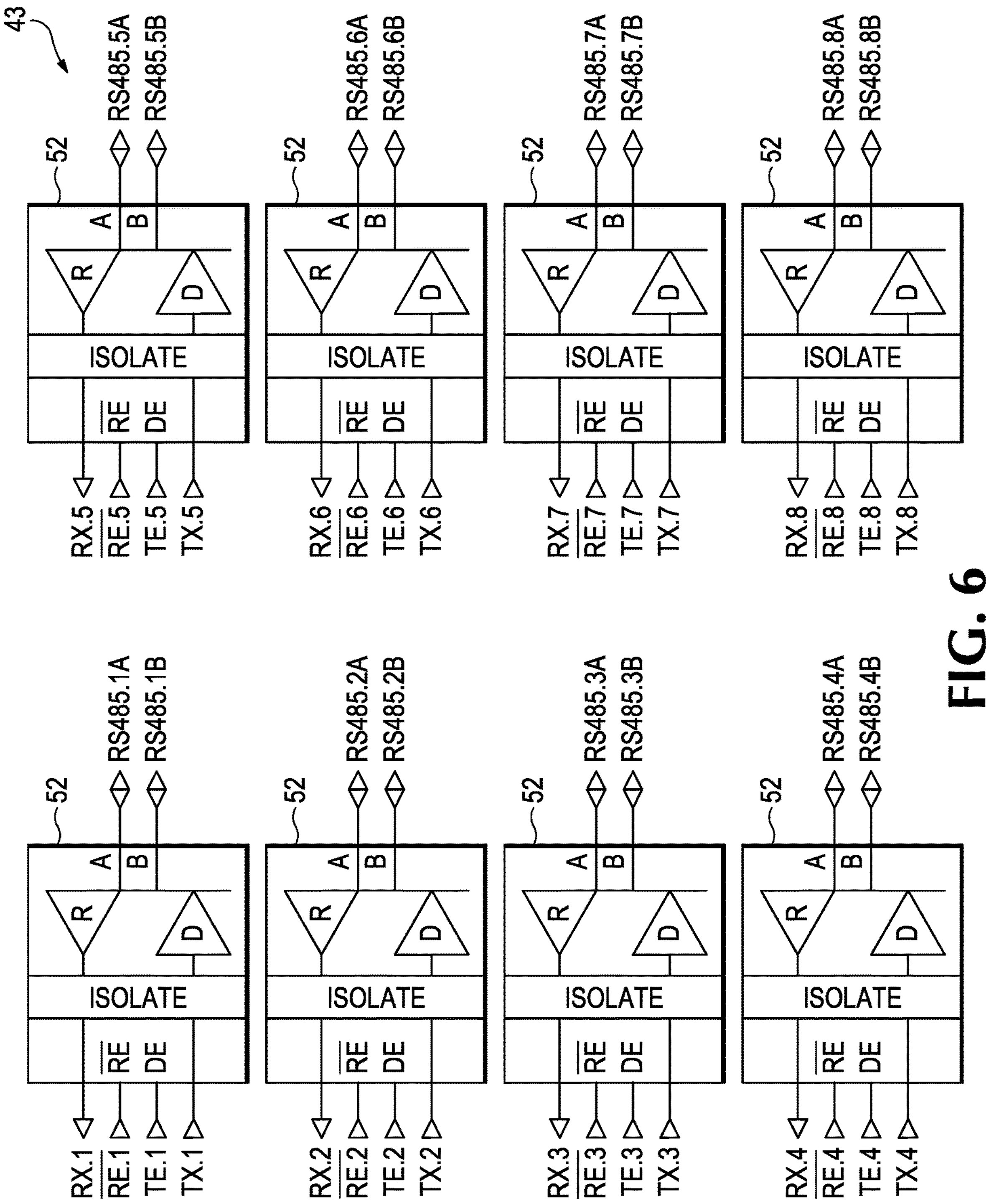
FIG. 6 shows the isolation circuit of FIG. 4B.

Returning again to FIG. 4B, the SAS data (shown in more detail at 50 in FIGS. 7A and 7B) on the RS485A and RS485B lines from each of game jacks 36 are connected to one side of a galvanic isolator circuit 43 shown in FIG. 4B and in more detail in FIG. 6. In the present embodiment, isolation is provided for each signal pair from the game jacks 36, like signal pair RS485.5A and RS485.5B in FIG. 6, by galvanically-isolated transceivers 52. In the present embodiments, transceivers 52 comprise model number ISO1410 manufactured by Texas Instruments. The other side of each transceiver 52 generates a TTL signal on 4 lines as shown and is connected to a microcontroller 53, shown generally in FIG. 4B and with more detail in FIGS. 5A and 5B.

In the present embodiments, microcontroller 53 comprises a SAM E53 microcontroller manufactured by Microchip. Each of the four lines of transceivers 52 is connected to microcontroller 53 via the correspondingly labeled lines in FIGS. 5A and 5B, on the one hand, and in FIG. 6. These connections are also shown in the diagram of FIG. 4B.

Figure 9A:
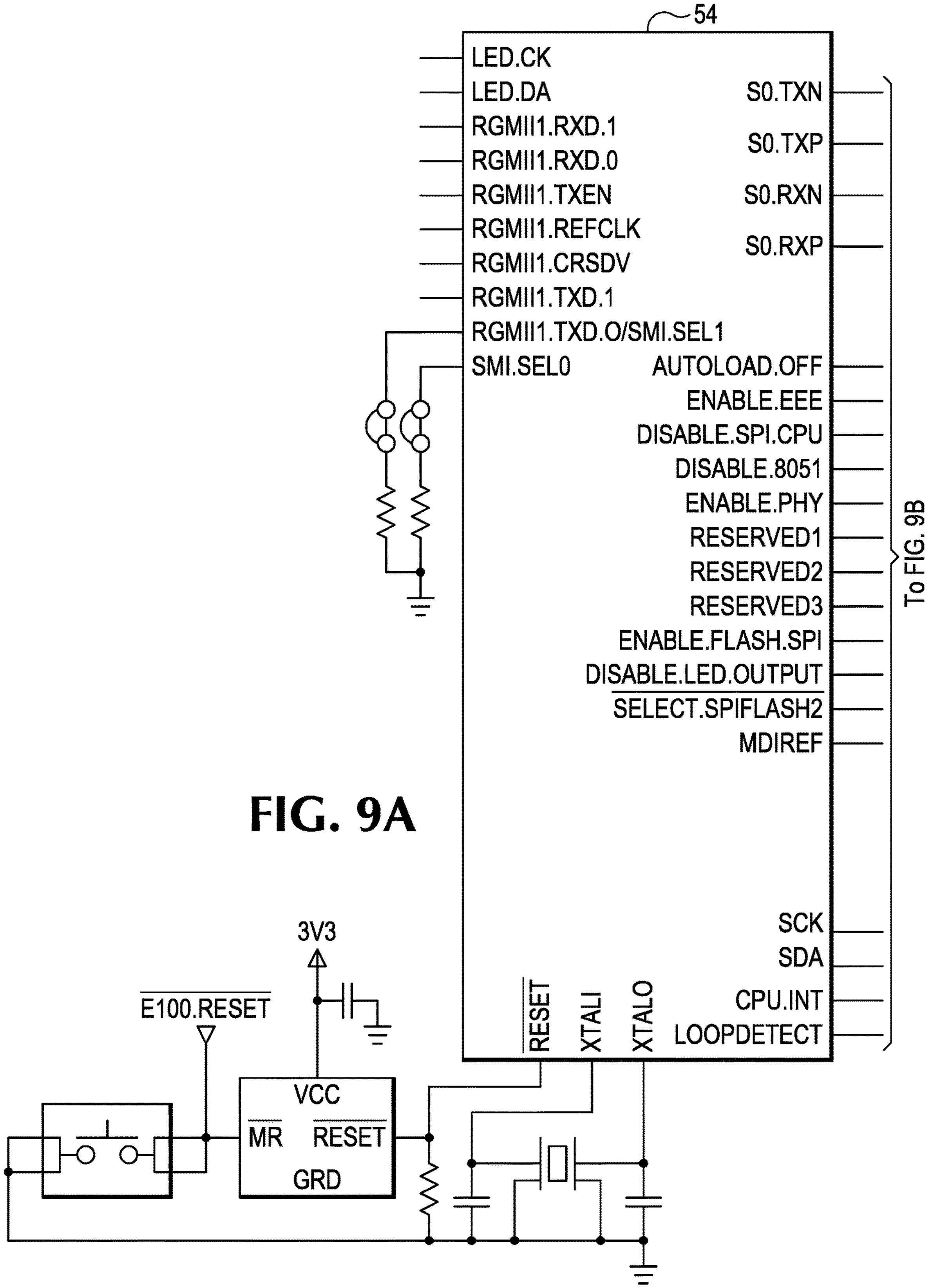
FIG. 9A, 9B, and 9C together depict Ethernet switch controllers, not shown in FIGS. 4A and 4B, that are used to control signals on the Ethernet switches shown in FIGS. 8 and 13 for the game jacks (FIGS. 7A and 7B) and the network jacks (FIGS. 10A, 10B, and 11), respectively.
Figure 9B:
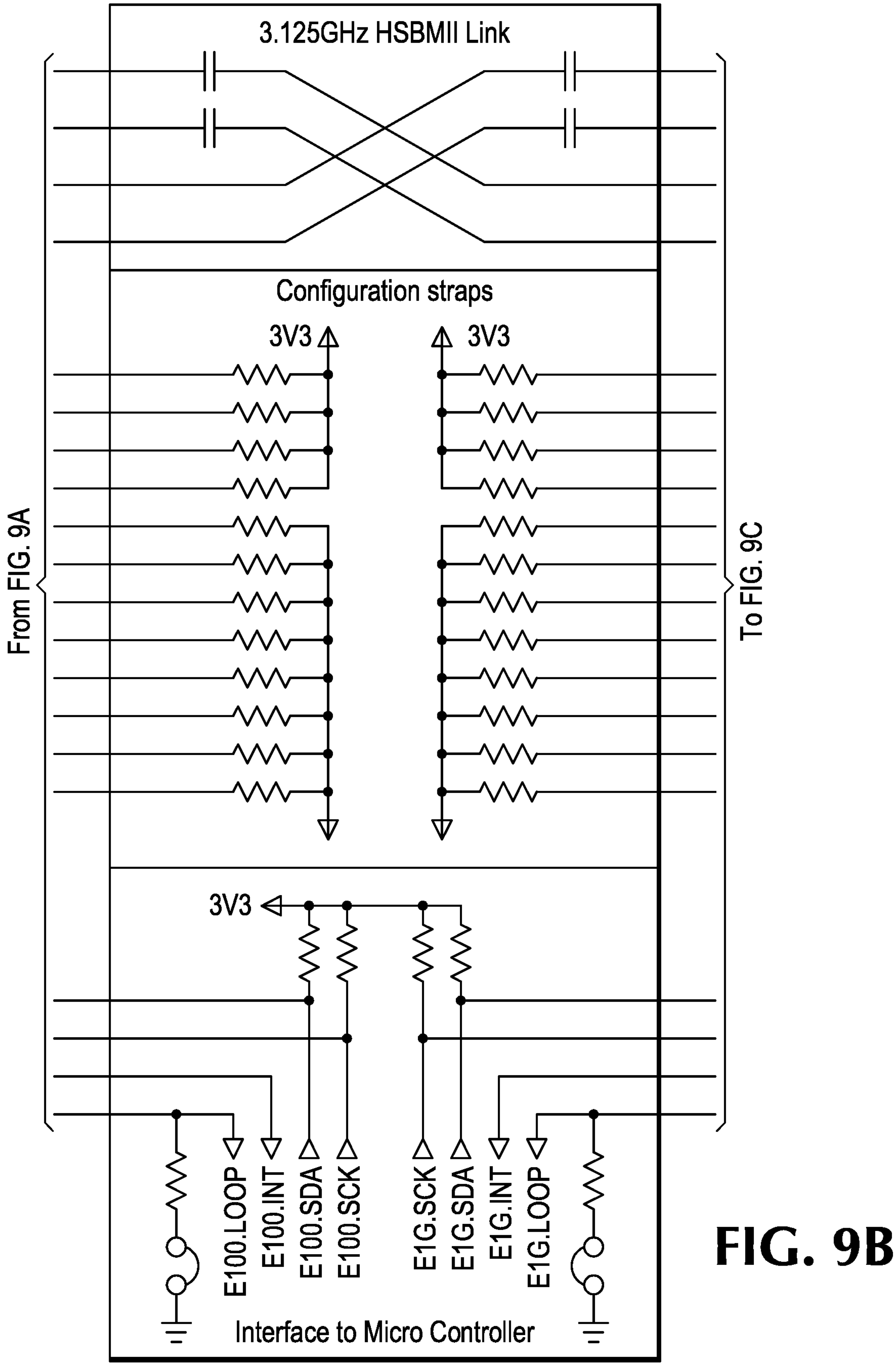
Figure 9C:
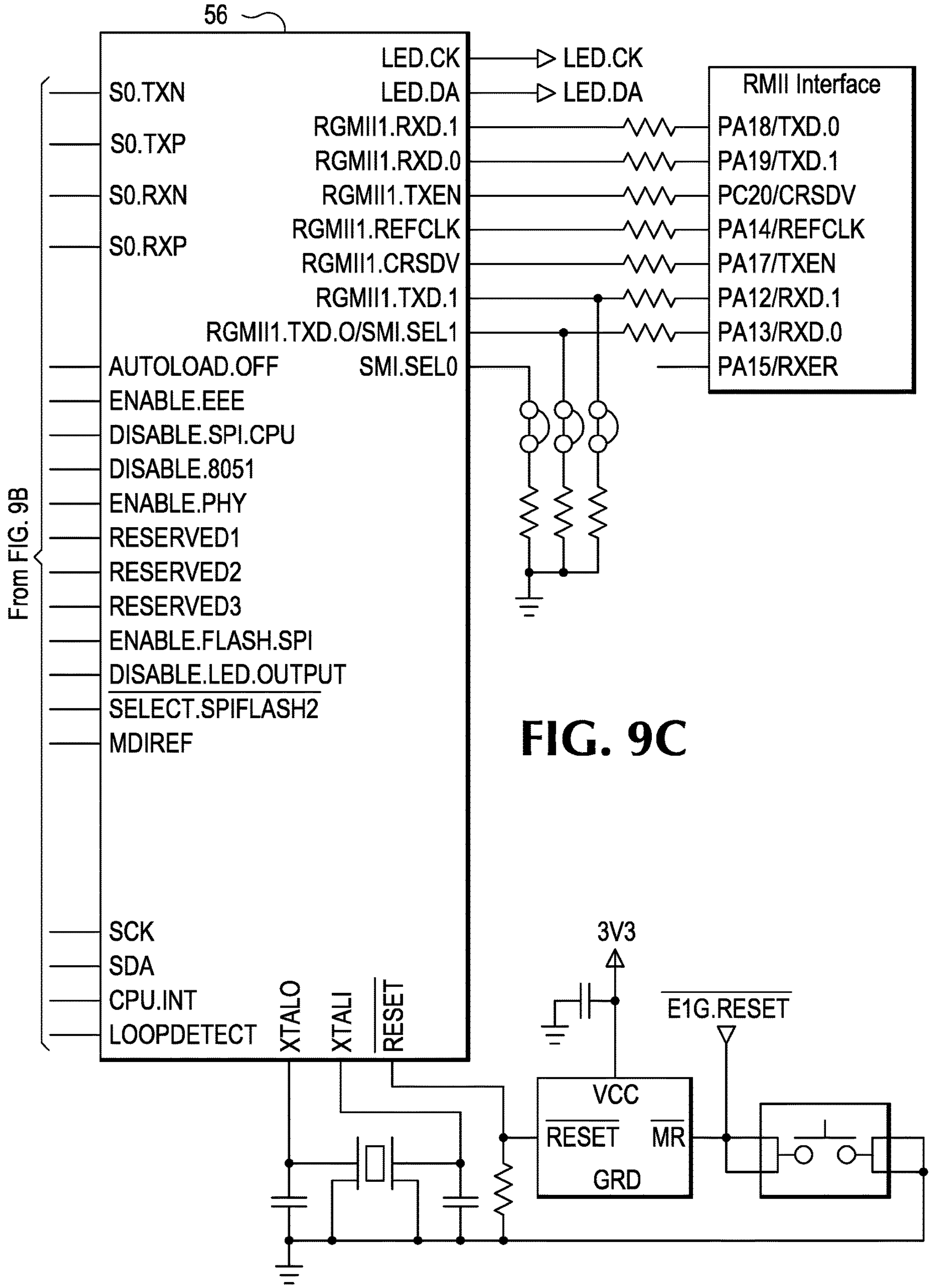

Microcontroller signal lines are also connected to Ethernet switch controllers 54, 56 in FIGS. 9A and 9C. In the present embodiments, each switch controller is a Realtek RTL8370MB-CG switch controller. Switch controller 54 controls 100 MB Ethernet communications, and switch controller 56 controls 1G Ethernet communications.

Both switch controllers 54, 56 are connected to microcontroller 53 in FIGS. 5A and 5B via the labeled lines shown at the bottom of FIG. 9B. The labels at the bottom of FIG. 9B correspond to labels on microcontroller 53 lines shown in FIGS. 5B. These connections are also shown in FIG. 4B at the lower portion of the microcontroller marked Ethernet Switch Logic. In addition, Ethernet switch controller 56 is connected to microcontroller 53 as shown in FIG. 9C in the block labeled RMII Interface (Reduced Media-Independent Interface), although these connections are not shown in FIGS. 4A, 5A, and 5B.

Turning again to FIGS. 4A and 4B, microcontroller 53 includes a line 58 that goes to one of the voltage regulators 60 in FIG. 4A. These include a 5V regulated power supply (not shown in the drawings). The 5V supply supplies network processor 42, which requires 5 volts at 3 amps. A signal on line 58 can be used to shut this power supply down under conditions that will be further explained. There is also a regulated 3V power supply for microcontroller 53, which draws considerably less current than network processor 42. In addition, there is an isolated regulated 5V power supply drawing 1 amp that supplies power to each GMI 12 and a 3.3V at 1-amp supply and 1V at 1-amp supply for the Ethernet switches.

Power is provided by power supply 61 in FIG. 4A, which is a 40-Watt supply that provides 12 volts to the voltage regulators. In the present embodiments, it is manufactured by XP Power under model number VEC40US12. It plugs into a conventional power outlet.

Figure 16:
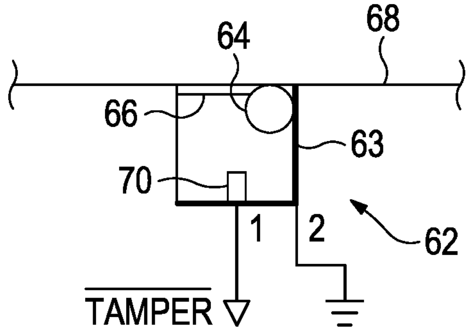
FIG. 16 illustrates the tamper detection device shown in FIG. 4A.

Beneath voltage regulators 60 in FIG. 4A is a tamper detection circuit 62, which is shown in more detail in FIG. 16. In the present embodiments, the circuit comprises a switch 63 that includes a magnetic ferrous ball 64, which adheres to a plate 66 that is part of the container for ball 64. The plate is relatively flush against a lid 68 of the metal box (not otherwise shown) that contains bridge 14. When the lid is lifted to gain access to bridge 14, the ball drops onto a contact 70, which completes a circuit between the container for ball 64, which is grounded as shown, and contact 70, which is connected to the TAMPER line in FIG. 4A. This provides a low-state signal to the microcontroller, which in turn sends generates a signal that destroy a cryptographic key in microcontroller 53. The key is used to encrypt and decrypt data sent to and from bridge 14. Destruction of the key under these circumstances prevents further operation of bridge 14 and the associated GMIs 12 until the box containing the bridge can be inspected (either by the manufacturer or the appropriate gaming authority) to confirm that all is in order and there has been no tampering. If that is the case, a new encrypted key is delivered over the network to return bridge 14 and its associated GMIs 12 to service.

Beneath tamper detection circuit 62 is a temperature monitoring circuit 72.

And beneath temperature monitoring circuit 72 is a supercapacitance (supercap) control circuit 74, which will be described in more detail after description of bridge 14 and GMI 12.

Figure 14:
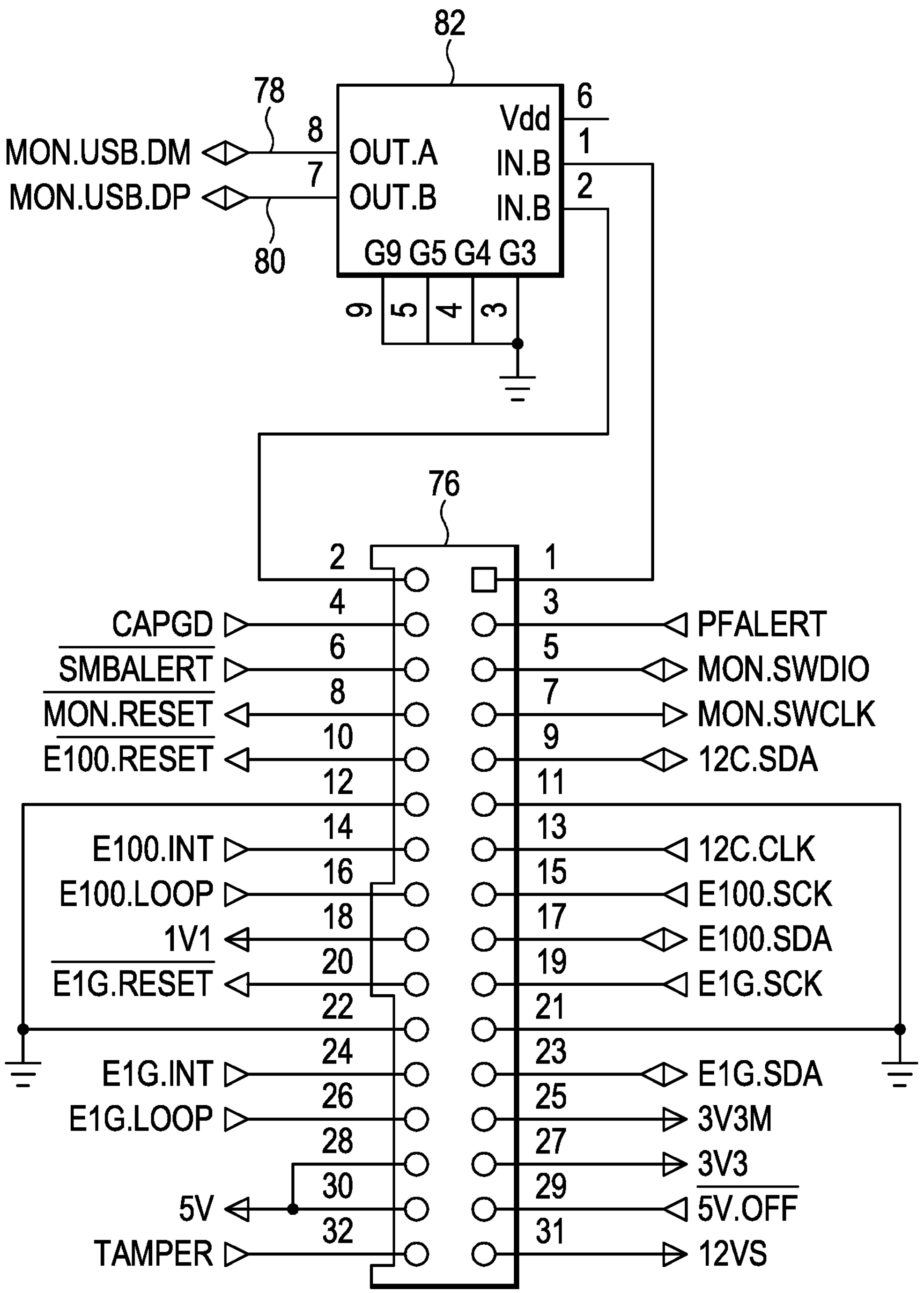
FIGS. 14 and 15 show the connectors for the single board computer shown in FIG. 4A.

Before considering operation of the supercap control circuit 74, consideration will be given to the manner in which network processor 42 is connected to other components in bridge 14. As previously mentioned, plugs on either end of cable 40 connect at one end to the Ethernet switch in FIG. 13 and at the other end to network processor 42. This connection is shown diagrammatically in FIGS. 4A and 4B. This connects network processor 42 to network 11. Network processor 42 is also connected to microcontroller 53 via a cable that includes USB, PIO (Programmed Input/Output), and 5V power, as shown in FIG. 4A. The jack on bridge 14 that enables this connection is shown at 76 in FIG. 14 with pin labels that correspond to those in FIG. 4A. The FIG. 4A diagram shows these connections in box 75 marked SBC Connect (SBC is single board computer, namely network processor 42). As can be seen on jack 76 in FIG. 14, each of the labeled lines is connected to a correspondingly labeled line in box 75, except for PFO, which is tied to the 5V line in FIG. 14. Two of the connections, namely MON.USB.DM on line 78 and MON.USB.DP on line 80 in FIG. 14 are filtered via a single pair common mode filter 82. The signals on lines 78, 80 are shown with corresponding labels in box 75 in FIG. 4A, which provide USB communication between network processor 42 and microcontroller 53.

Figure 15:
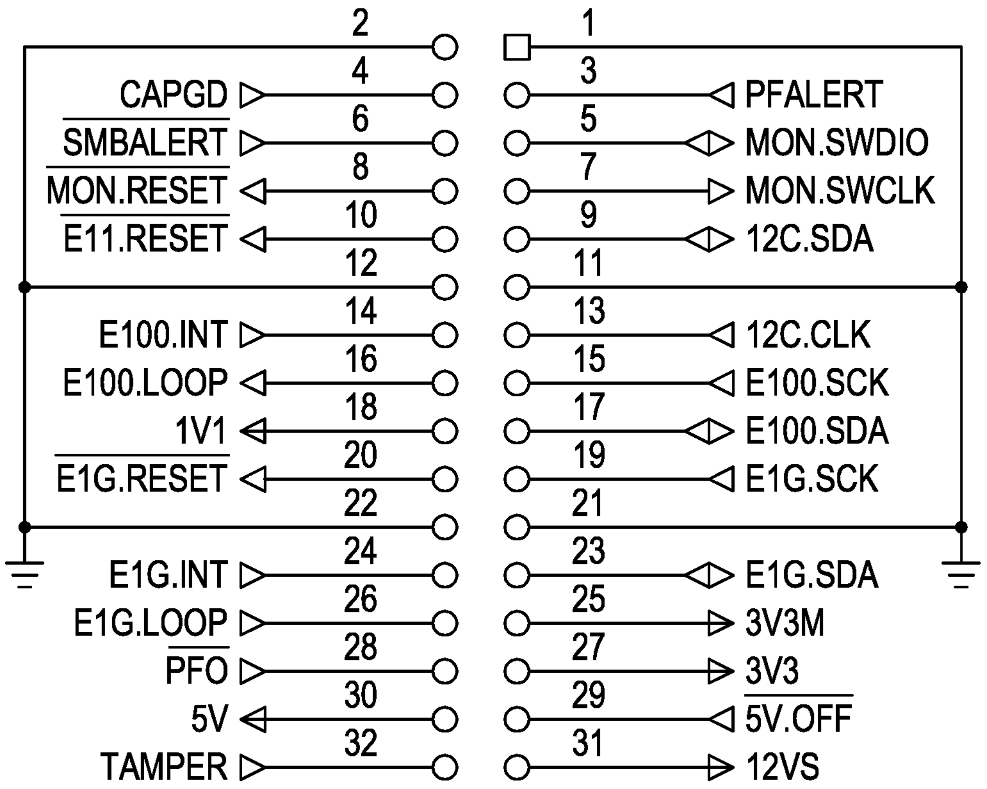

FIG. 15 is a second jack having similar connections to jack 76 in FIG. 14. The jack in FIG. 15 may be used for diagnostics.

Consideration will now be given to the structure of GMI 12 and how it is connected to its associated EGM10 and to its associated bridge 14. GMI 12 is shown in several drawings, FIGS. 17-20. It is formed on two boards, one of which is a motherboard, indicated generally at 77 in FIG. 20. The motherboard includes 3 jacks 78, 79, 80. Jack 78 receives a plug (not shown) on one end of a cable 13, in FIG. 1. The other end of cable 13 also includes a plug that is connected to any one of game jacks 36 in FIG. 7A and 7B, thus connecting GMI 12 to bridge 14.

Jack 79 is an expansion port, which is not used in the current embodiments. It is available to connect to equipment on an EGM, such as a player tracking unit, a bonus feature, or any other auxiliary device that could be implemented using communications over network 11. The pins in jack 79 are tied to the pins in jack 78 and therefore may communicate with the pins in the associated gaming jack 36 to which cable 13 is connected in the same manner as jack 78.

Figure 17:
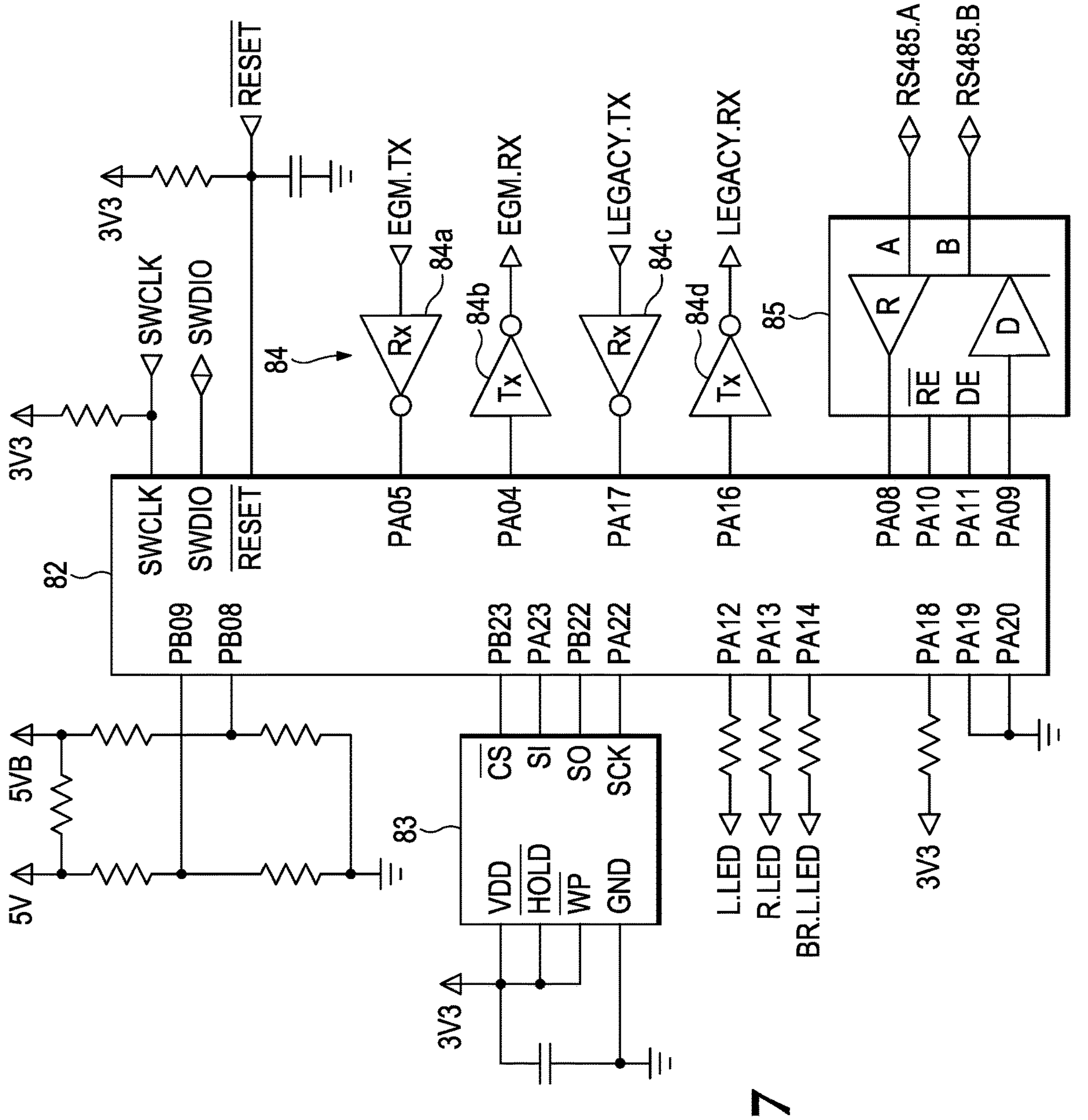
FIGS. 17-20 show the components on the gaming machine interface board shown in FIG. 1 for present embodiments of the system.
Figure 18:
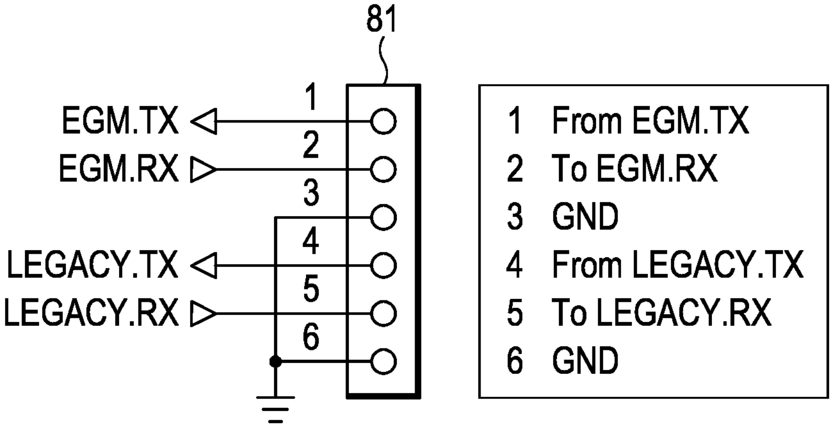
Figure 19:
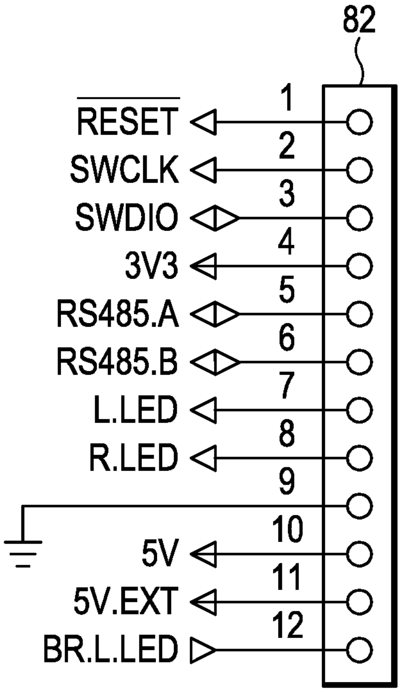

Jack 80 provides communication between motherboard 77 and a daughterboard, the components of which are shown in FIGS. 17-18. One end of a cable (not shown) is plugged into jack 80 and the other end of the cable is plugged into a jack 82, in FIG. 19, on the daughterboard. The signal labels shown on the pins of jack 82 are connected to correspondingly labeled lines in FIG. 17.

A brief description of a typical gaming network into which the present embodiments are installed will aid understanding of how GMI 12 is further connected. As mentioned above, prior art systems for managing and providing services to EGMs typically include a suite of programs that deal with such things as accounting, cashless tickets, loyalty, and audit functions. The prior art system is referred to herein as a legacy host system. Communication with each EGM and the network that provides these services is made through the primary SAS port of each EGM. The primary SAS port is the only port that permits transfers of credits to and from the machine so must be used whenever money is transferred to and from the EGM, e.g., bonus credits, TITO transactions, etc. As a result, the port to which GMI 12 must be connected is already connected to the network.

The current embodiments address this situation by connecting to network 11 in a manner that interposes bridge 14 between the EGM and the legacy host system. When installing GMI 12 when a legacy system is present, the cable from the legacy system that is plugged into the primary SAS port of EGM 10 is first unplugged. Interposing bridge 14 between the host system and EGM 10 is accomplished via a jack 81 in FIG. 18, which receives one end of a connector (not shown) that plugs into jack 81. Two cables (also not shown) emerge from the plug that connects with jack 81. The other end of one of the cables is a male plug that connects to the SAS port (not shown) of EGM 10 with which GMI 12 is associated. And the other end of the other cable is a female plug that plugs into the host system cable. As a result, GMI 12 communicates with both the EGM, the signals of which are labeled EGM.TX (transmit) and EGM.RX (receive) in FIG. 18, and the host legacy system, the signals of which are labeled LEGACY.TX and LEGACY.RX in FIG. 18. These EGM and legacy signals are on lines on the daughterboard that are correspondingly labeled in FIG. 17.

Turning now to FIG. 17, a microcontroller 82 is responsible for, among other things, SAS communications with its associated EGMs. In the present embodiments, microcontroller 82 comprises a SAMD51G18A microcontroller manufactured by Microchip Technology. The microcontroller includes internal memory, and it is also connected to a ferroelectric random-access memory 83. Memory 83 is an MR45V064B memory manufactured by Lapis Semiconductor Co. in the present embodiments. It can retain data for up to 10 years without a source of power.

A line driver and receiver device, indicated generally at 84, is connected to receive and transmit ports on microcontroller 82 in FIG. 17 as shown. Device 84 includes two receive drivers 84_a_, 84_c_ and two transmit drivers 84_b_, 84_d_. These drivers are connected to transmit and receive lines for the EGM SAS port and the legacy system port via jack 81 in FIG. 18. In the present embodiments, device 84 is a TRS3232 manufactured by Texas Instruments.

Microcontroller 82 is programmed with a SAS replicator. As a result, when the legacy system sends a SAS command, it is received at GMI 12 by microcontroller 83 via line driver 84_c_ in FIG. 17. For example, if a player at the EGM presses the cashout button to receive a TITO ticket for the balance on the EGM credit meter, that command is received by line driver 84_a_ and passed to the legacy system via driver 84_d_. When the legacy system determines all is in order, it assigns a ticket number for the TITO ticket and sends that data with a command to issue the ticket, which is received by line drier 84_c_. When this happens, the SAS replicator acknowledges the command, and immediately confirms to the legacy system that it has been executed. This must be done quickly for timing reasons. The confirmation is sent by microcontroller 82 via the transmit line driven by line driver 84_d_. Next, microcontroller 82 generates a SAS command to issue the ticket, which is sent to the EGM via line driver 84_b_.

In the event of a power failure that happens between the time bridge 14 confirms issuance of the ticket to the legacy system and the time the command to issue the ticket is sent to the EGM via line driver 84_b_, the data for this transaction is stored in FeRAM 83. When power is restored, the data is retrieved and the transaction is completed. Further attention will be given to the manner in which bridge 14 responds to a power failure.

In this manner bridge 14 is interposed between the legacy system and the EGM. If the operator of the EGMs wishes to implement a TITO system provided by a vendor different from the vendor that provided the legacy system, the new TITO system can be implemented as a computer process run by network processor 42. When that happens the legacy system may still remain in place because it may be providing other services, such as accounting and collecting player-tracking data. But legacy TITO commands received at driver 84_c_ are ignored because all TITO communications and commands are being transmitted via line drivers 84_a_, 84_b_.

Many of the new services, such as TITO and bonuses, can be provided via software installed at bridge 14. This vastly reduces the regulatory burden. While the software must be approved, in many cases no additional hardware is required. This enables small design firms and even individuals to provide various products that require only new software.

In this way, various services, such as bonusing, dispatch, player-tracking, etc., can be implemented, one at a time, on bridge 14 while leaving the legacy system in place. An operator of EGMs may be interest in receiving EGM data to use for analytics and reporting. As previously mentioned, most prior art systems poll only for events, such as a cashout, hand-pay jackpot, etc., and current meter values. The present embodiments poll rapidly and continuously to receive data that represents virtually all activity on the EGM, including reel stops, time between game play, and the like. If new data is detected, the present system generates a request to receive all available data. In other words, if the present system detects any available activity, it requests and polls for everything. This provides a robust data stream for reporting and analytics. The present system can be installed to provide only this data stream initially and thereafter be expanded to provide additional services, one at a time, as previously described.

Figure 20:
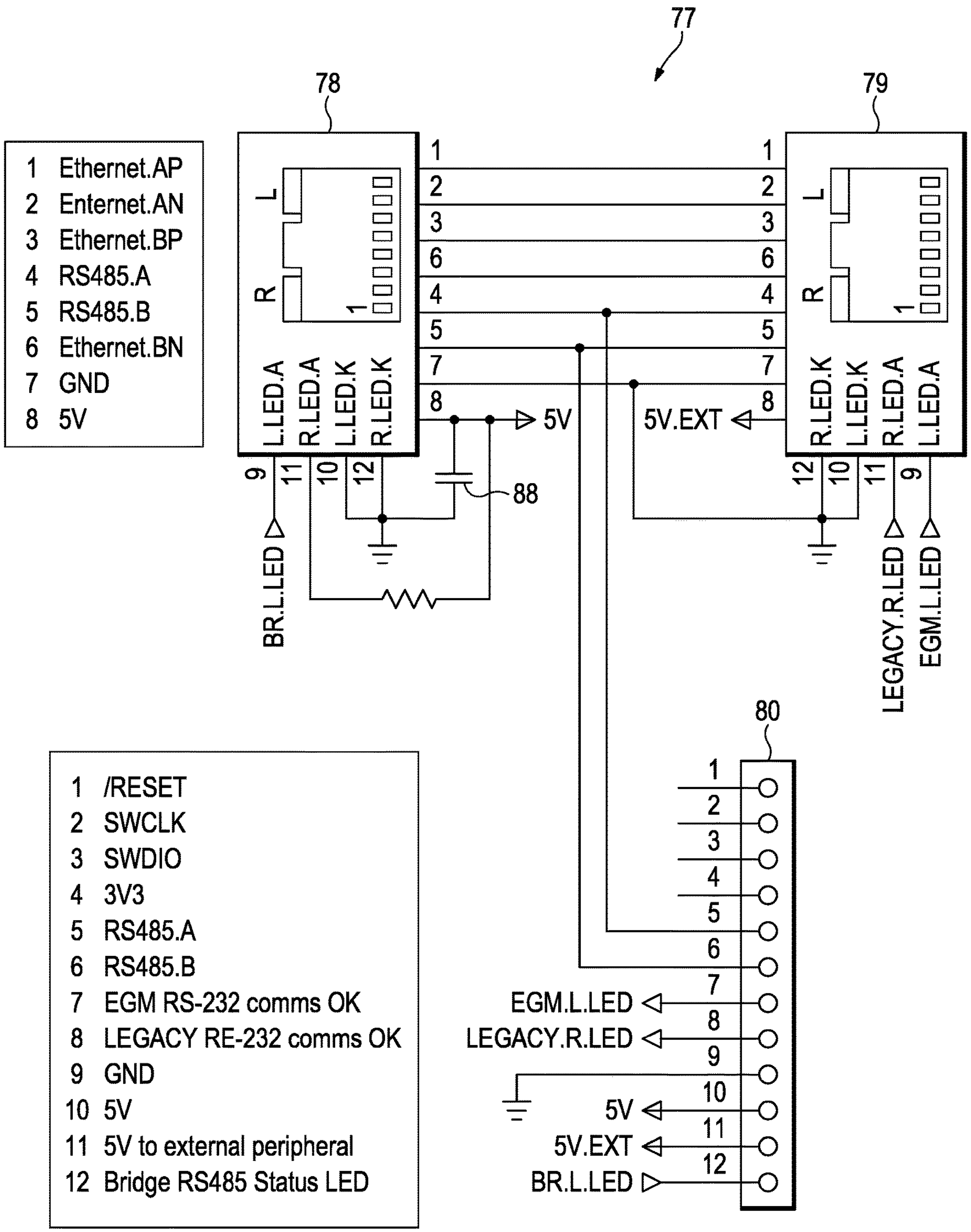
Figure 21:
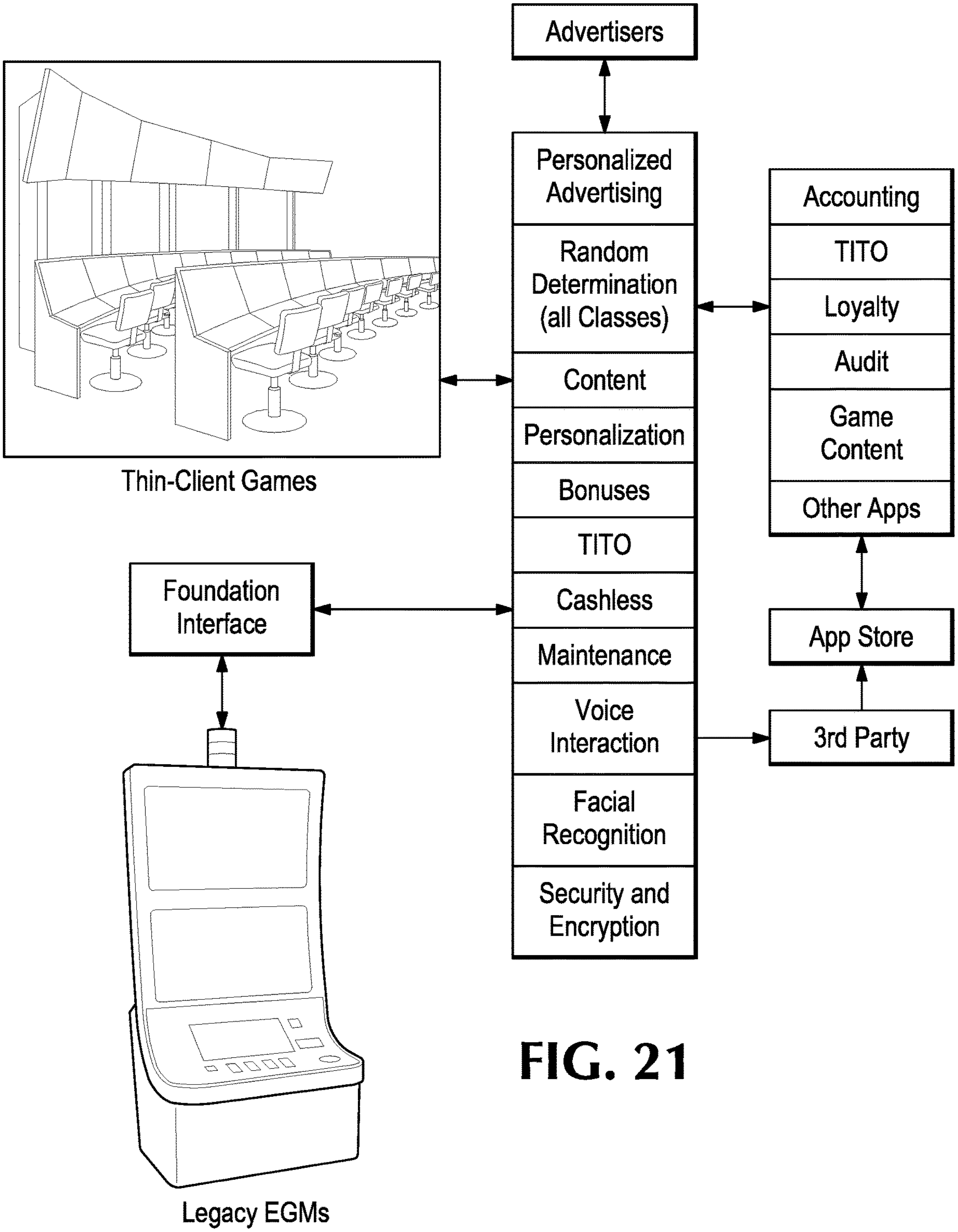
FIG. 21 is a highly schematic depiction of the architecture of one embodiment of the present system.

Another line driver 85 includes a driver and receiver with electrostatic discharge protection. In the present embodiments, line driver 85 is an SN65HVD72 half-duplex line driver and receiver manufactured by Texas Instruments. Line driver 85 is connected to the R485.A and RS485.B lines from jack 82 in FIG. 19, which (as shown in FIG. 20) is connected via jack 80 to lines on jack 78. As will be recalled jack 78 is connected to one of game jacks 36. These are the transmit and receive lines between GMI 12 and bridge 14.

The signal lines SWCLK and SWDIO are lines that can be used to program flash memory contained in microcontroller 82. These lines are connected to the corresponding lines in jack 82 and from there via a cable (not shown) that connects the motherboard and daughterboard and ultimately via jack 78 to one of game jacks 36 on bridge 14. This enables the flash memory in microcontroller 82 to be programmed with code delivered to it over network 11.

The four lines that connect to memory 83 are used to store transactions in process that are contained in a memory of microcontroller 82 in the event of a power failure, as will be more fully described.

The LED lines on the lower left of microcontroller 82 drive LEDs that are diagnostic indicators to indicate the status of the communications between the EGM and GMI 12 and between the legacy host and GMI 12.

The remaining components in FIG. 17 show power supply connections, biasing resistors, and capacitors, which are routinely used in connection with microcontrollers, like microcontroller 82.

The present embodiments rely on a number of existing software programs to build the infrastructure of applications and users to trust each other and interact with each other securely and effectively. Consul and Nomad, both open-source programs provided by HashiCorp, provide dynamic application coordination. Vault, also open source and provided by HashiCorp, provides the backbone for security and trust. Kafka, an open source program provided by Apache Software Foundation, provides asynchronous messaging and publish/subscribe functionality for communications from one bridge 14 to another. These programs enable a single identified bridge 14 to be a master, e.g., in connection with issuing TITO tickets, and all the others to be slaves. The master tracks and issues ticket numbers at the single bridge 14 and authorizes other bridges accordingly when a TITO ticket is authorized to be issued. If the master goes out of service, another board is automatically selected to become the new master, thus providing seamless operation.

Consideration will now be given to various backup power supplies, which are each provided by large capacitors that are kept charged during normal operation, i.e., when power supply 61 in FIG. 4A is connected to power. There are three sources of backup power that each provide a different function.

The first backup power supply is supercap control 74 in FIG. 4A. Although not depicted in a drawing beyond FIG. 4A, circuit 72 includes a high current supercapacitor backup controller and system monitor manufactured by Linear Technology and identified as LTC3350EUHF. This device controls charging of 4 10-Farrad capacitors connected in series.

Along with several power MOSFETs and biasing components, the Linear Technology device maintains a charge on the 4 capacitors. These capacitors back up the 5V and 3.3V regulated power supplies for microcontroller 53 and various other components.

These capacitors have enough stored charge to provide power to all components on bridge 14 and its associated GMIs 12 for at least 30 seconds. If power is out for under 30 seconds, or if it drops below normal levels for a short time, supercap control 74 maintains power to all components on bridge 14 and GMIs 12 associated with the bridge. As a result, normal operation continues without interruption for short power failures and brownouts.

If, however, the power failure extends beyond 30 seconds, supercap control 74 generates a signal that goes to microcontroller 53. In response, microcontroller 53 launches a process that notifies network processor 42 that power is about to be lost. In response, bridge 14 and the GMIs 12 associated with the bridge begin a partial-shutdown operation and enter a hibernation mode during which a second backup power supply, indicated generally at 86 in FIG. 5B, provides power to microcontroller 53 only. Power to network processor 42, which draws a large current compared to microcontroller 53 is removed. In addition, any data in microcontroller 82 in FIG. 17 on the GMI daughterboard is stored in FeRAM 83.

Second backup power supply 86 includes a 1 amp diode 87 with a very low voltage drop. In the present embodiments, diode 87 is a MAX40200 manufactured by Maxim Integrated. Second backup power supply 86 also includes a 45 Farad capacitor, which has enough charge to run microcontroller 53 for at least 100 hours. Its only function during this time is to detect a tamper signal from circuit 62, in FIGS. 4A and 16. As will be recalled, the cryptographic key expires every 48 hours and a new encrypted key is delivered over the network. If the power is out long enough for the key to expire, no new key will be delivered. Or if the tamper circuit detects that the box containing bridge 14 is opened, the key will be destroyed.

In either of these circumstances, the box containing bridge 14 must be inspected, by either the manufacturer or an appropriate gaming authority, and reset to receive a new key when the box is reinstalled. This procedure provides a highly secure environment for data transactions handled by bridge 14.

A third backup power supply comprises a capacitor 88 in FIG. 20. This capacitor maintains power to microcontroller 83 for a short time in the event cable 13 is unplugged. As will be recalled, cable 13 provides power to GMI 12. When the voltage on capacitor 88 drops below a predefined value, microcontroller 82 shuts down in the same manner as when it receives a signal from bridge 14 indicating that power supply 61 is no longer providing sufficient power to run bridge 14. As a result, if cable 13 is unplugged, any SAS data in microcontroller 82 is stored in FeRAM 83. When power is restored, i.e., when cable 13 is plugged back in, that data is retrieved and microcontroller 82 resumes processing where it left off.

What is claimed is:

1. A method comprising:

detecting, by a master circuit, data from one or more electronic gaming machines indicating that an input is received at a money-input device;

detecting data from the one or more electronic gaming machines indicating that a cashout actuator is actuated;

sending the detected data over a network;

receiving detected data over the network from one or more slave circuits that are connected to the one or more electronic gaming machines;

sending data over the network to the one or more slave circuits that are connected to the one or more electronic gaming machines at which the input was received at the money-input device, the sent data authorizing a credit balance according to the received input;

sending data over the network to any of the one or more slave circuits that are connected to electronic gaming machines at which the cashout actuator is actuated, the sent data authorizing transfer of the credit balance to one of a printed ticket or an account; and causing a database server to periodically fetch data from one or more non-volatile rapid access memories associated with the one or more slave circuits.

2. The method of claim 1, further comprising:

determining the master circuit has failed; and selecting a slave circuit of the one or more slave circuits to serve as a new master circuit.

3. The method of claim 1, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

4. The method of claim 1, further comprising storing the detected data in a backup server.

5. The method of claim 1, A method comprising:

detecting, by a master circuit, data from one or more electronic gaming machines indicating that an input is received at a money-input device, detecting data from the one or more electronic gaming machines indicating that a cashout actuator is actuated;

sending the detected data over a network;

receiving detected data over the network from one or more slave circuits that are connected to the one or more electronic gaming machines wherein the one or more slave circuits are enclosed by one or more tamper-proof containers, wherein each tamper-proof container of the one or more tamper-proof containers is less than about 8 inches by 8 inches by 2 inches, and wherein each tamper-proof container of the one or more tamper-proof containers is positioned within one or more of: a cabinet of an electronic gaming machine or a base of the electronic gaming machine;

sending data over the network to the one or more slave circuits that are connected to the one or more electronic gaming machines at which the input was received at the money-input device, the sent data authorizing a credit balance according to the received input; and sending data over the network to any of the one or more slave circuits that are connected to electronic gaming machines at which the cashout actuator is actuated, the sent data authorizing transfer of the credit balance to one of a printed ticket or an account.

6. An apparatus comprising:

one or more processors; and a memory storing processor-executable instructions that, when executed by the one or more processors, cause the apparatus to:

detect data from one or more electronic gaming machines indicating that an input is received at a money-input device;

detect data from the one or more electronic gaming machines indicating that a cashout actuator is actuated;

send, via a master circuit, the detected data over a network;

receive detected data over the network from any one or more slave circuits that are connected to the one or more electronic gaming machines;

send data over the network to the one or more slave circuits that are connected to the one or more electronic gaming machines at which the input was received at the money-input device, the sent data authorizing a credit balance according to the received input;

send data over the network to any of the one or more slave circuits that are connected to the one or more electronic gaming machines at which the cashout actuator is actuated, the sent data authorizing transfer of the credit balance to one of a printed ticket or an account; and cause a database server to periodically fetch data from one or more non-volatile rapid access memories associated with the one or more slave circuits.

7. The apparatus of claim 6, wherein the processor-executable instructions, when executed by the one or more processors, further cause the apparatus to:

determine the master circuit has failed; and select a slave circuit of the one or more slave circuits to serve as a new master circuit.

8. The apparatus of claim 6, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

9. The apparatus of claim 6, wherein the processor-executable instructions, when executed by the one or more processors, further cause the apparatus to store the detected data in a backup server.

10. An apparatus comprising:

one or more processors; and a memory storing processor-executable instructions that, when executed by the one or more processors, cause the apparatus to:

detect data from one or more electronic gaming machines indicating that an input is received at a money-input device;

detect data from the one or more electronic gaming machines indicating that a cashout actuator is actuated; send, via a master circuit, the detected data over a network;

receive detected data over the network from any one or more slave circuits that are connected to the one or more electronic gaming machines, wherein the one or more slave circuits are enclosed by one or more tamper-proof containers, wherein each tamper-proof container of the one or more tamper-proof containers is less than about 8 inches by 8 inches by 2inches, and wherein each tamper-proof container of the one or more tamper-proof containers is positioned within one or more of: a cabinet of an electronic gaming machine or a base of the electronic gaming machine;

send data over the network to the one or more slave circuits that are connected to the one or more electronic gaming machines at which the input was received at the money-input device, the sent data authorizing a credit balance according to the received input; and send data over the network to any of the one or more slave circuits that are connected to the one or more electronic gaming machines at which the cashout actuator is actuated, the sent data authorizing transfer of the credit balance to one of a printed ticket or an account.

11. A method comprising:

detecting, by a master circuit, data from one or more electronic gaming machines indicating that an input is received at a mechanism for transferring monetary value;

detecting data from the one or more electronic gaming machines indicating that a cashout actuator is actuated;

sending the detected data on a network;

receiving, via the network, from a second circuit, the detected data;

sending data over the network to one or more slave circuits that are connected to the one or more electronic gaming machines at which the input was received at a money-input device authorizing a credit balance on an electronic gaming machine of the one or more electronic gaming machines according to the received input; and sending data over the network to the one or more slave circuits that are connected to electronic gaming machines at which the cashout actuator is actuated authorizing transfer of the credit balance on the electronic gaming machine to one of a printed ticket or an account; and causing a database server to periodically fetch data from one or more non-volatile rapid access memories associated with the one or more slave circuits.

12. The method of claim 11, further comprising:

determining the master circuit has failed; and selecting a slave circuit of the one or more slave circuits to serve as a new master circuit.

13. The method of claim 11, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

14. The method of claim 11, further comprising storing the detected data in a backup server.

15. The method of claim 11, A method comprising:

detecting, by a master circuit, data from one or more electronic gaming machines indicating that an input is received at a mechanism for transferring monetary value;

detecting data from the one or more electronic gaming machines indicating that a cashout actuator is actuated;

sending the detected data on a network;

receiving, via the network, from a second circuit, the detected data;

sending data over the network to one or more slave circuits that are connected to the one or more electronic gaming machines at which the input was received at a money-input device authorizing a credit balance on an electronic gaming machine of the one or more electronic gaming machines according to the received input, wherein the one or more slave circuits are enclosed by one or more tamper-proof containers, wherein each tamper-proof container of the one or more tamper-proof containers is less than about 8 inches by 8 inches by 2 inches, and wherein each tamper-proof container of the one or more tamper-proof containers is positioned within one or more of: a cabinet of the electronic gaming machine or a base of the electronic gaming machine; and sending data over the network to the one or more slave circuits that are connected to electronic gaming machines at which the cashout actuator is actuated authorizing transfer of the credit balance on the electronic gaming machine to one of a printed ticket or an account.

16. An apparatus comprising:

one or more processors; and memory storing processor-executable instruction that, when executed by the one or more processors, cause the apparatus to:

detect data from one or more electronic gaming machines indicating that an input is received at a mechanism for transferring monetary value;

detect data from the one or more electronic gaming machines indicating that a cashout actuator is actuated;

send, via a master circuit, the detected data on a network;

receive, via the network, from a second circuit, the detected data;

send data over the network to one or more slave circuits that are connected to the one or more electronic gaming machines at which the input was received at a money-input device authorizing a credit balance on an electronic gaming machine of the one or more electronic gaming machines according to the received input;

send data over the network to the one or more slave circuits that are connected to electronic gaming machines at which the cashout actuator is actuated authorizing transfer of the credit balance on the electronic gaming machine to one of a printed ticket or an account; and cause a database server to periodically fetch data from one or more non-volatile rapid access memories associated with the one or more slave circuits.

17. The apparatus of claim 16, wherein the processor-executable instructions, when executed by the one or more processors, further cause the apparatus to:

determine the master circuit has failed; and select a slave circuit of the one or more slave circuits to serve as a new master circuit.

18. The apparatus of claim 16, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

19. The apparatus of claim 16, wherein the processor-executable instructions, when executed by the one or more processors, further cause the apparatus to store the detected data in a backup server.

20. The apparatus of claim 16, An apparatus comprising:

one or more processors; and memory storing processor-executable instruction that, when executed by the one or more processors, cause the apparatus to:

detect data from one or more electronic gaming machines indicating that an input is received at a mechanism for transferring monetary value;

detect data from the one or more electronic gaming machines indicating that a cashout actuator is actuated;

send, via a master circuit, the detected data on a network;

receive, via the network, from a second circuit, the detected data;

send data over the network to one or more slave circuits that are connected to the one or more electronic gaming machines at which the input was received at a money-input device authorizing a credit balance on an electronic gaming machine of the one or more electronic gaming machines according to the received input, wherein the one or more slave circuits are enclosed by one or more tamper-proof containers, wherein each tamper-proof container of the one or more tamper-proof containers is less than about 8inches by 8 inches by 2 inches, and wherein each tamper-proof container of the one or more tamper-proof containers is positioned within one or more of: a cabinet of the electronic gaming machine or a base of the electronic gaming machine; and send data over the network to the one or more slave circuits that are connected to electronic gaming machines at which the cashout actuator is actuated authorizing transfer of the credit balance on the electronic gaming machine to one of a printed ticket or an account.

21. The method of claim 5, further comprising:

determining the master circuit has failed; and selecting a slave circuit of the one or more slave circuits to serve as a new master circuit.

22. The method of claim 5, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

23. The apparatus of claim 10, wherein the processor-executable instructions, when executed by the one or more processors, further cause the apparatus to:

determining the master circuit has failed; and selecting a slave circuit of the one or more slave circuits to serve as a new master circuit.

24. The apparatus of claim 10, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

25. The method of claim 15, further comprising:

determining the master circuit has failed; and selecting a slave circuit of the one or more slave circuits to serve as a new master circuit.

26. The method of claim 15, wherein the one or more slave circuits are configured to communicate with one another to send data stored in a non-volatile rapid access memory from a first slave circuit of the one or more slave circuits to a second slave circuit of the one or more slave circuits, wherein the second slave circuit is configured as backup storage.

* * * * *